United States Patent [19]
Middleton et al.

[11] Patent Number: 4,924,374
[45] Date of Patent: May 8, 1990

[54] METHOD FOR AUTOMATIC POSITION CONTROL OF A TOOL

[75] Inventors: Christohper O. Middleton, Capitola; Colin L. Robson, San Jose, both of Calif.

[73] Assignee: Spectra Physics, San Jose, Calif.

[21] Appl. No.: 204,541

[22] Filed: Jun. 9, 1988

[51] Int. Cl.$^6$ .................... G06F 15/20; G05D 1/04
[52] U.S. Cl. .................... 364/167.01; 172/4.5; 364/424.07; 364/561; 367/127
[58] Field of Search .......... 364/424.07, 474.34, 364/474.35, 474.37, 177, 551.01, 571.07, 575, 474.18, 167.01, 561, 562; 318/624; 56/10.2, DIG. 15; 73/624–629; 172/4, 4.5, 13; 367/97–99, 127, 908

[56] References Cited

U.S. PATENT DOCUMENTS

| | | | |
|---|---|---|---|
| 2,780,795 | 2/1957 | Ambrosio | 340/3 |
| 3,495,663 | 2/1970 | Scholl et al. | 172/4.5 |
| 3,554,291 | 1/1971 | Rogers et al. | 172/4.5 |
| 3,561,538 | 2/1971 | Curlett et al. | 172/4.5 |
| 3,609,671 | 9/1971 | Webster et al. | 340/3 E |
| 3,637,026 | 1/1972 | Snow | 172/4.5 |
| 3,974,699 | 8/1976 | Morris et al. | 73/510 |
| 4,263,973 | 4/1981 | Boulais et al. | 172/4.5 |
| 4,365,301 | 12/1982 | Arnold et al. | 364/474.37 |
| 4,371,942 | 2/1983 | Damikolas | 364/474.34 |
| 4,428,055 | 1/1984 | Zurbrick et al. | 364/474.37 |
| 4,439,846 | 3/1984 | Rodriquez | 367/99 |
| 4,567,766 | 2/1986 | Seiferling | 73/597 |
| 4,581,726 | 4/1986 | Makino et al. | 367/99 |
| 4,604,681 | 8/1986 | Sakashita | 364/177 |
| 4,663,712 | 5/1987 | Kishida | 56/10.2 |
| 4,733,355 | 3/1988 | Davidson et al. | 364/424.07 |
| 4,775,940 | 10/1988 | Nishida et al. | 364/562 X |
| 4,818,925 | 4/1989 | Lahm et al. | 364/474.34 X |

FOREIGN PATENT DOCUMENTS 0260113 3/1988 European Pat. Off. .
0262990 4/1988 European Pat. Off. .
8713874 1/1988 Fed. Rep. of Germany .

OTHER PUBLICATIONS

Spectra-Physics Construction & Agricultural Division Laserplane® Technical brochure, No. 22481-016, 1986, Dayton, Ohio.

Primary Examiner—Joseph Ruggiero
Attorney, Agent, or Firm—Irell & Manella

[57] ABSTRACT

A method and apparatus for automaticlly controlling the position of a tool carried by a machine, which in the preferred embodiment may be the blade of a grader or paver for leveling a surface at a chosen depth. The method includes determination of time taken for an acoustic pulse to travel from a transducer to a reference surface and back, with this value being used to calibrate a microprocessor-controlled distance-measuring device. As the grader moves over a surface to be graded, the distance to the reference surface is constantly detected by a repeated emission and detection of such acoustic pulses. The timing of the echoed pulses is converted to addresses in a look-up table which contains control words symbolizing commands to be given to hydraulic rams carried by the grader. By implementing these commands, the depth of the blade relative to the reference surface is constantly updated, compensating for variations with the height of the reference surface. A thermistor is provided to automatically compensate for temperature variations as the grading takes place. Displays are provided for the operator of the vehicle to show what type of adjustments are being made to the blade, and whether the height of the reference surface is outside the range of sensitivity of the follower. The follower is automatically calibrated for a given blade depth by repeated incrementation of a delay time variable until a zero adjustment command is generated for the blade control.

4 Claims, 27 Drawing Sheets

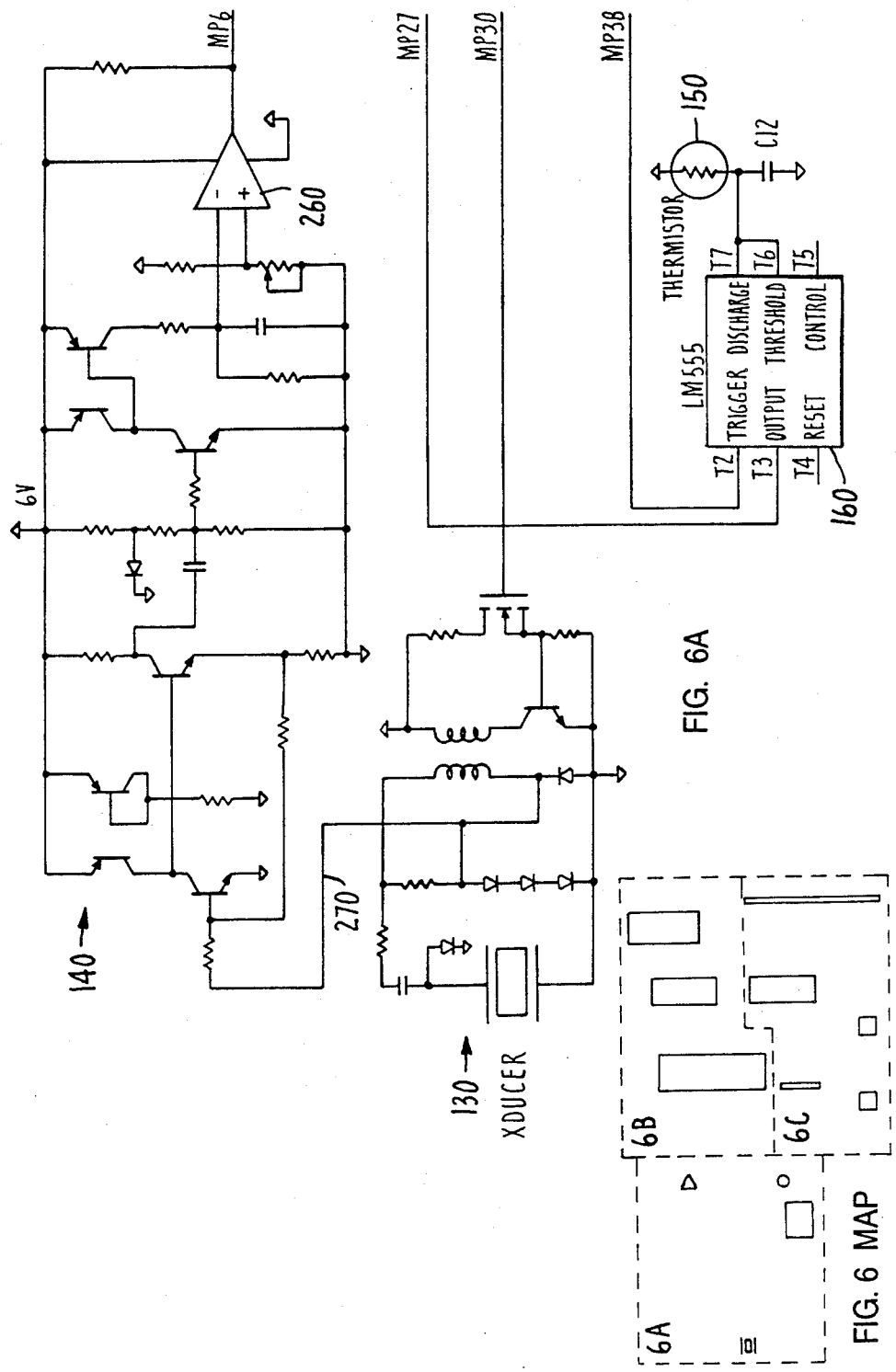

METHOD FOR AUTOMATIC POSITION CONTROL OF A TOOL

BACKGROUND OF THE INVENTION

This invention relates to earth grading and paving machines, and specifically relates to a method for automatically controlling the depth of the blade carried by such a machine for maintaining a desired grading or paving height relative to a reference surface.

In conventional grading vehicles, an operator of the vehicle will set the height of the blade on a surface to be graded at a particular depth relative to a reference surface. Typically, the operator may grade a portion of the gradable surface until the proper depth is reached, and then will continue with the blade at that height for the remainder of the job. The reference surface may be an adjacent portion of ground, a standard string line against which vertical measurements may be taken, or a roadside curb. In the contact method of following, the string line or other reference surface is actually contacted by the follower to detect changes in the height of the reference surface.

A problem with the conventional approach is that the reference surface will typically vary in height, often by a very significant amount. However, the graded surface is usually required to be within closed tolerances. Thus, a need exists for a reliable means of maintaining the blade at a constant depth relative to the reference surface, despite variations in the height of the latter.

In some prior art systems, such as in the U.S. Patent to Davidson et al., No. 4,733,355, an acoustic sensor has been used to follow the reference surface. Such prior art systems, however, have several drawbacks. One is that the acoustic sensor must be manually calibrated by the operator of the vehicle, who must measure the height of the sensor relative to the reference surface and/or the depth of the blade, and must physically adjust the blade height (using a ruler to measure the height) in order to calibrate it for a chosen grading depth. Normally, this is done by a two-man operation. The prior art system uses an acoustic signal echo to measure distance, and uses timing windows to determine the approximate round trip time of the return echo. A green light and an "high" and "low" signals are used to signal to the operator when the blade is on the proper grade, is too high or is too low, respectively. There is an acoustic generator unit which is mounted on the side of an earth mover and which generates an acoustic signal which is directed toward the reference surface.

To use the prior system, the operator of the earth mover must set the blade at the proper height relative to the reference surface. This requires finding a place where the grade and the reference surface are already separated by the desired amount and setting the blade there, or digging the appropriate grade. In the latter case, an assistant must follow behind the grader or paver with a measuring stick to measure the grade for the driver of the earth mover, so as to indicate when the appropriate grade has been achieved. If an assistant is not available, then the operator of the vehicle must repeatedly adjust the blade height and then climb down off the grader and measure the distance between the reference surface and the graded surface. If the separation of these two surfaces is not correct, the above-described process must be repeated until the desired offset is achieved. Once the correct grade is arrived at, the acoustic transmitter must be manually adjusted until a green light indicating a "lock-on" at the appropriate height is generated. This process is cumbersome and time consuming. If two workers are used, there are considerable extra expenses and availability problems. Accordingly, a need has arisen for a system which can automatically "lock on" to the correct blade height with only one worker.

Another drawback of present systems is that they make no provision for the fact that a grader or paver may be used over a period of many hours during the day, during which time the temperature may change significantly. As air temperature in the vicinity of the sensor changes, errors are introduced into the following ability of the system, because changes in temperature cause changes in air density, which in turn lead to changes in the speed of sound. Since the sensor results depend on travel time of the pulse, errors result when temperature changes are not compensated. Moreover, in the prior systems, adjustments for such errors would have to be made manually.

Another drawback of systems presently in use is that they provide no indication to the operator of the grader when the reference surface height varies outside the range of sensitivity of the system. Thus, the height of the reference surface may rise or drop drastically, and for such changes it is undesirable to make concomitant drastic changes in the depth of the graded surface. Prior art systems do not provide indications to the operator of when the height of the reference surface exceeds the acceptable limits.

SUMMARY OF THE INVENTION

The present invention provides a system for automatically controlling the position of a tool without the above disadvantages of prior systems. The tool may be the blade on an earth grader or a road paver, whose depth is adjusted by the system. The grader or paver, or other machine carrying a tool, is provided with a follower incorporating a microprocessor with a program for automatically controlling the height of a blade relative to a reference surface. The follower is mounted on a frame carried by the blade, which is in turn carried by the grader in a vertically adjustable manner. The follower includes an ultrasonic transducer coupled to the microprocessor, with the transducer emitting series of acoustic pulses for echoing by the reference surface back to the transducer. The microprocessor detects the time at which the echo returns to the transducer, and generates a count relating to this time, with the count then being used as a pointer address to address a look-up table (or "control table"). The control table contains control words relating to upward and downward adjustments of the frame and blade height, to accommodate upward or downward variations in the height of the reference surface. These control words are provided as input to the control box in the cab of the grader, which then sends signals to a hydraulic valve system including rams for raising and lowering the blade, which causes raising and lowering of the follower as well. In addition, lights or other displays are provided on the follower and the control box to indicate to the operator the action being taken.

In the preferred embodiment, using an autorange routine the program first automatically determines the time for the pulse to travel through the air from the follower to the reference surface and back again. This is done by emitting the pulse from the follower, waiting a certain amount of time determined by a delay variable, and then incrementing a counter whose value is saved at the time the reflected pulse reaches the follower. The counter value at that time is utilized as the pointer address for the control table, and the delay variable is repeatedly adjusted by the program until the resulting pointer address points to a control word in the control table which relates to zero adjustment to the height of the blade, and which is located centrally in the control table.

The count of the counter at the time the reflected or echoed pulse returns, in combination with the delay time, represents the total amount of time an acoustic pulse took to travel from the follower to the reference surface and back.

After the delay variable is calibrated for a chosen follower height above the reference surface (and therefore a chosen blade depth with respect to the reference surface), the grading process is begun. As the operator drives along, the microprocessor causes the transducer to repeatedly send out acoustic pulses, and upon receiving the reflected pulses determines whether the height of the reference surface is higher, the same as, or lower than the calibration height. Changing the distance from the follower to the reference surface causes different control words in the control table to be addressed, because the count generated by the counter will be different depending upon the time taken for the pulse to travel from the follower to the reference surface and back. Thus, alterations in the height of the reference surface are automatically accommodated by the different control words, which are used as commands to raise or lower the blade.

A temperature compensation method is implemented by the circuitry contained within the follower. A thermistor, in combination with other circuitry, generates a value which is related to the ambient temperature. This value is utilized to effectively alter the calibrated delay variable, such that changes in the air temperature in the vicinity of the follower will not lead to changes in the offset depth of the blade, i.e. in the accuracy of the work being done.

Both the follower and the control box are provided with light or LCD displays which are governed by the control words, which indicate whether a command has been given to raise or lower the blade, or to make no adjustment, and to further display error signals to indicate to the operator that the reference surface is so high or so low that it is outside the desired range of activity of the follower.

A switch is provided on the control box, along with a numerical display, to allow the operator of the vehicle to make known adjustments (of 1/100' increments) to the blade depth without stopping the grading process, exiting the grader, or requiring the assistance of another worker.

The follower is coupled to any one of a number of off-the-shelf control boxes by an interface which is standard to all the boxes. Provision is made in the circuitry of the invention to allow the microprocessor to automatically determine what type of control box is being utilized without independent instructions needed from the operator. For instance, the microprocessor may determine whether a standard earth grader control box or a paving machine control box is being utilized.

Another switch is provided on the follower (or on the control box) so that the operator of the vehicle may select a desired error margin (sometimes hereafter referred to as "deadband width"), depending upon the precision required for a given job. This switch is electrically coupled to the microprocessor, and provides a signal thereto directing the microprocessor to utilize a selected one of a plurality of different control tables, with each control table containing a particular set of control words, depending on the error margin chosen.

In an alternative embodiment, the follower is calibrated in a single pass through an alternative autoranging routine, wherein the delay variable is determined by decrementing an accumulator from a maximum value of the delay variable until the echoed pulse is received, and then adjusting the end value of the accumulator by an amount corresponding to the appropriate address in the control table relating to zero adjustment to the height of the blade.

In another alternative embodiment, the delay variable is not utilized to calibrate the follower to the reference surface. Rather, the total travel time for the reflected pulse is determined by a single counter, and then a particular control table address is subtracted therefrom, and the result is compared with subsequent total times for emitted pulses, with the results being utilized to address the appropriate control words in the control table for adjustments to the height of the blade.

By utilizing different control tables, the error margin for the height of the blade may be set by the operator, with the selection of a particular control table being governed by the position of a switch on the follower or on the control box.

Other objects, features and advantages will appear more fully in the course of the following discussion.

BRIEF DESCRIPTION OF THE DRAWINGS

FIG. 7C, is an INCREASE DELAY procedure utilized by the main program, and FIG. 7D is a DECREASE DELAY procedure utilized by the main program;

FIG. 17C is the INCREASE DELAY procedure utilized by the paver program, and FIG. 17D is the DECREASE DELAY procedure utilized by the paver program;

DESCRIPTION OF THE PREFERRED EMBODIMENTS

Figure 1:
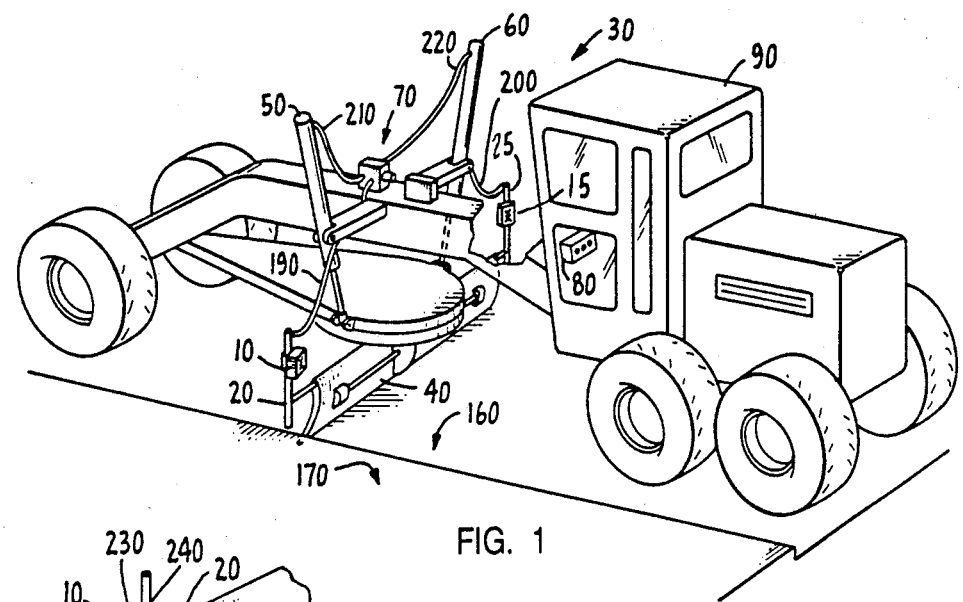
FIG. 1 is a perspective view of a typical earth grader shown with the invention in place.

Referring to FIG. 1 of the drawings, the device implementing the invention herein includes a follower 10, which is mounted on a frame 20 carried by an earth grader 30. In the preferred embodiment, the frame is mounted on a mold board or blade 40, which is itself carried by the grader 30, and thus both the frame 20 and the blade 40 are carried by the grader. The frame and blade are vertically adjustable by means of hydraulic rams 50 and 60. (In an alternative embodiment, the blade may be mounted on the frame, and the frame in turn carried by the grader.) Each hydraulic ram 50 and 60 governs the height of one side of the blade 40, and the rams 50 and 60 are in turn governed by a hydraulic valve system 70. Another follower 15 is provided, which is mounted on a frame 25 carried by the blade 40. The valve system 70 is controlled by the followers 10 and 15, in a manner to be described below. Each follower 10 and 15 includes a microprocessor and circuitry as depicted in the schematic diagram of FIG. 6, and each follower 10 and 15 is connected to a control box 80 which is preferably mounted in a cab 90 of the grader 30 for viewing and operation by an operator of the grader. The structure and operation of the invention will hereinafter be described relative to the follower 10 and frame 20, but apply equally to the follower 15 and frame 25.

Figure 6B:
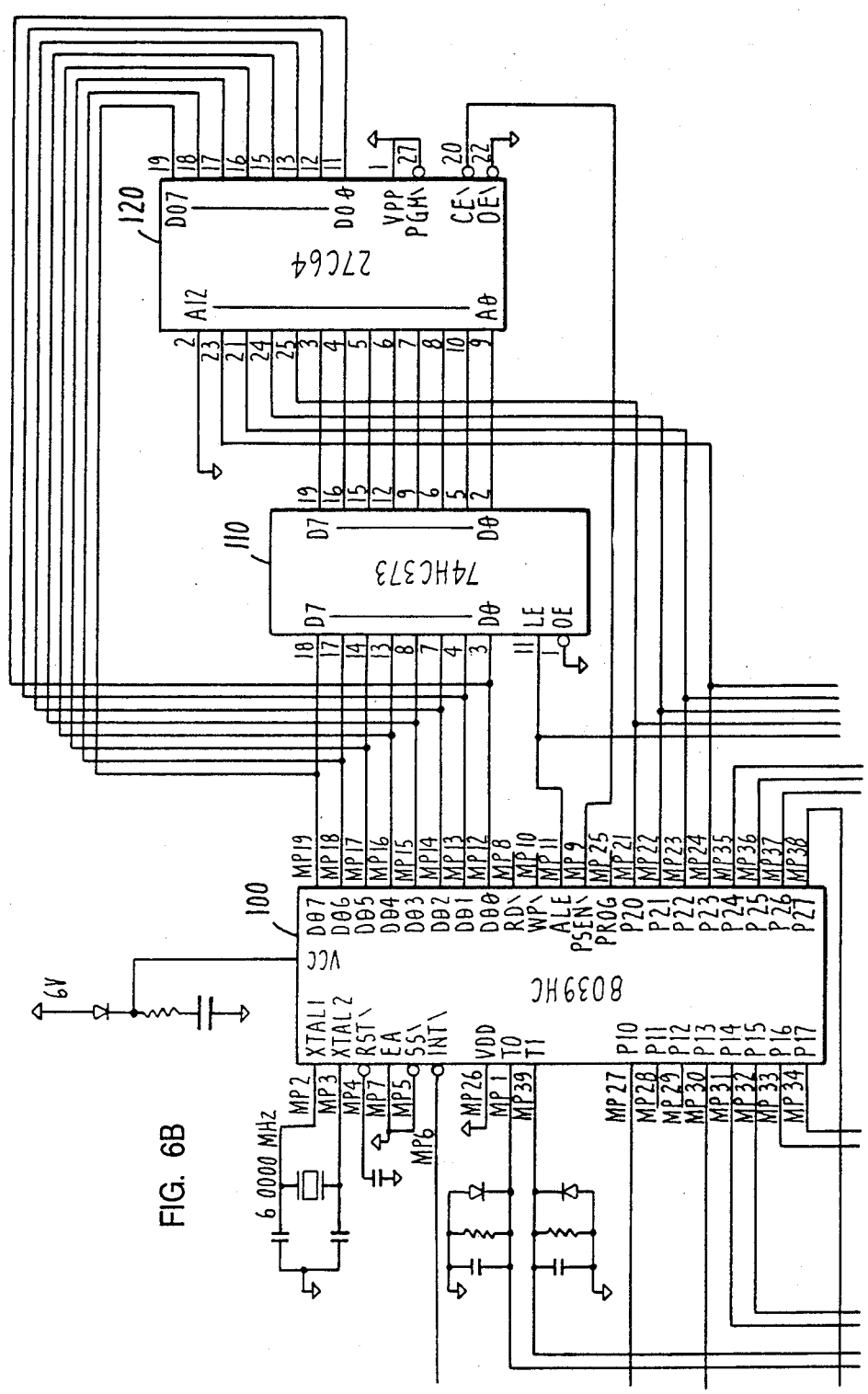
FIG. 6 is a schematic diagram of circuitry implementing the invention.
Figure 6C:
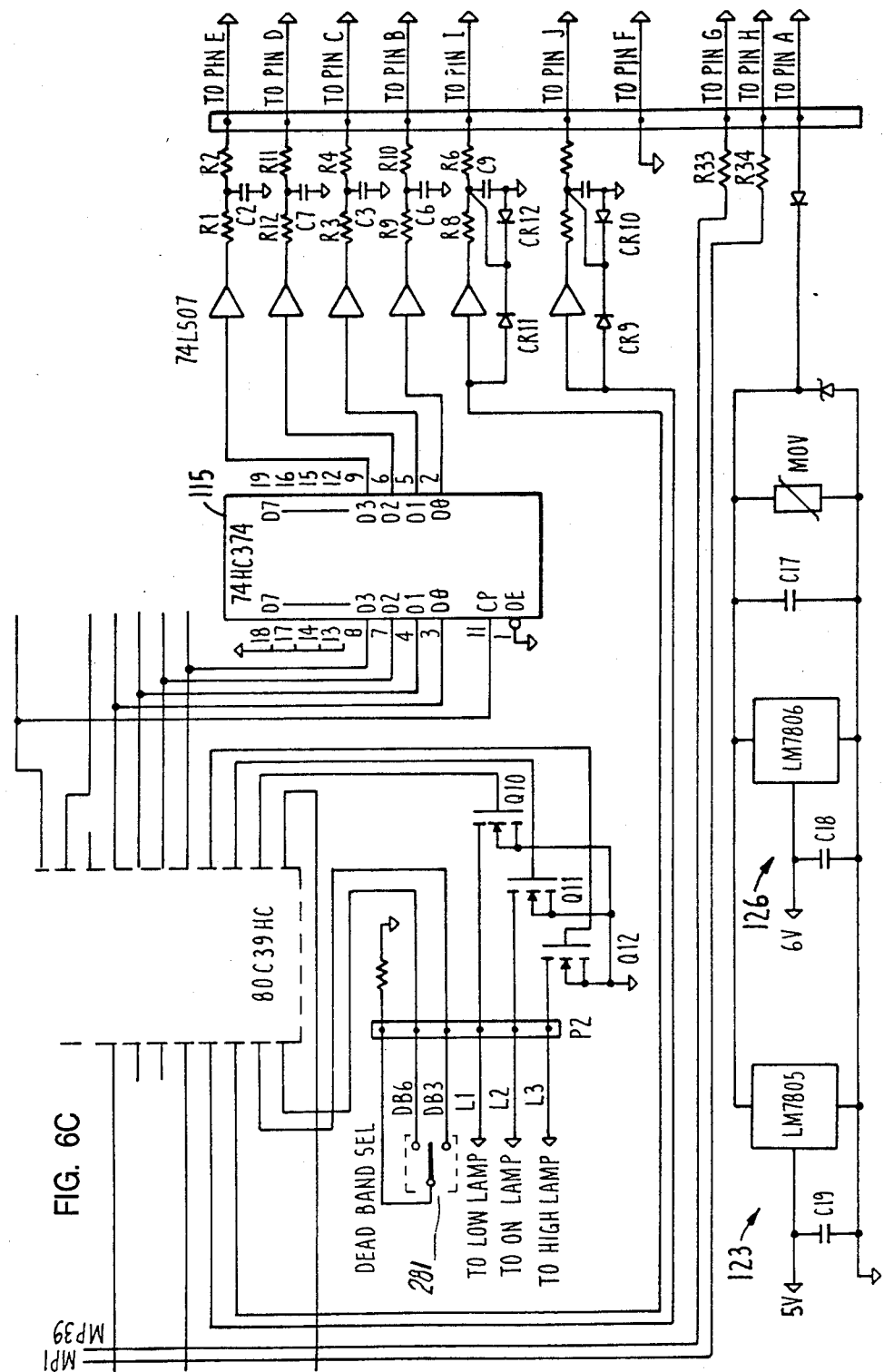

Referring to FIG. 6, a microprocessor 100, which is preferably a standard 80C39 processor, is mounted in the follower 10, and is connected via a standard address latch 110 to an EPROM 120, which contains a program for implementing the functions according to the teachings of the invention. Also connected to the microprocessor, and controlled thereby, is a transducer 130, which in the preferred embodiment comprises the Polaroid Ultrasonic Ranging System available from Polaroid Corporation of Cambridge, Mass., and described in detail in the Polaroid Corporation booklets entitled "Ultrasonic Ranging System" and "Polaroid Ultrasonic Ranging System Handbook." An analog receiving section 140 amplifies analog signals received from the transducer 130 for input to the microprocessor 100. A thermistor 150 has an output connected to a one-shot 160, which has a trigger input T2 connected to an output pin at port 27 (designated "P27") of the microprocessor 100 and has an output connected to an input pin at port P10 of the microprocessor 100. In the course of the following discussion, the apparatus of the invention will be described in detail in connection with the explanation of the method of implementing it.

Figure 4:
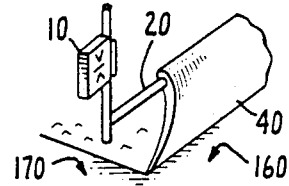
FIG. 4 is a perspective view of the follower of the invention following a reference ground surface.

According to the teachings of the invention, the following is the method of use of same. Referring again to FIG. 1, an operator of the earth grader 30 grades a first ground surface 160 relative to a reference ground surface 170, such that the surface 160 is a desired depth relative to the surface 170, as shown in FIG. 1. Typically, this requires a second worker (called a "grade checker") with a ruler, who must inform the grader operator that the grade is at the desired depth, which comprises a reference offset for the blade. This depth may be typically some inches below the surface 170 or, as depicted in FIG. 4, may be at the same level as the surface 170. A string line 181 or a curb 190 may also act as the reference surface.

The operator then powers up the system of the invention from the control box 80, at which time the transducer 130 contained in the follower 10 emits an acoustic chirp, i.e. a series of acoustic pulses, which travels to the reference surface 170 (or 181 or 190) and is reflected back to the follower 10. In a manner to be described below, the total time of travel for the chirp to echo back to the follower 10 is detected, by stopping a counter which was started when the chirp was emitted. In the preferred embodiment, two counters are used. This count of the counter when it is stopped comprises a total travel time value for the chirp. The microprocessor 100 uses this time value to control the blade level and to calibrate the system, i.e., achieve a "lock-on" to the desired depth. Thereafter, as the operator drives the grader 30, the follower 10 continues to emit acoustic chirps, thus detecting any change in the level of the reference surface 170. If, for instance, the level of the surface 170 rises, the follower circuitry detects this, and sends a signal to the hydraulic valve system 70 instructing it to raise the blade 40 and frame 20, such that a constant distance is maintained between follower 10 and the surface 170, thus ensuring that the blade 40 remains at a constant depth or offset relative to the surface 170. In this manner, the ground surface 160 is graded to a constant offset from the surface 170.

Figure 5:
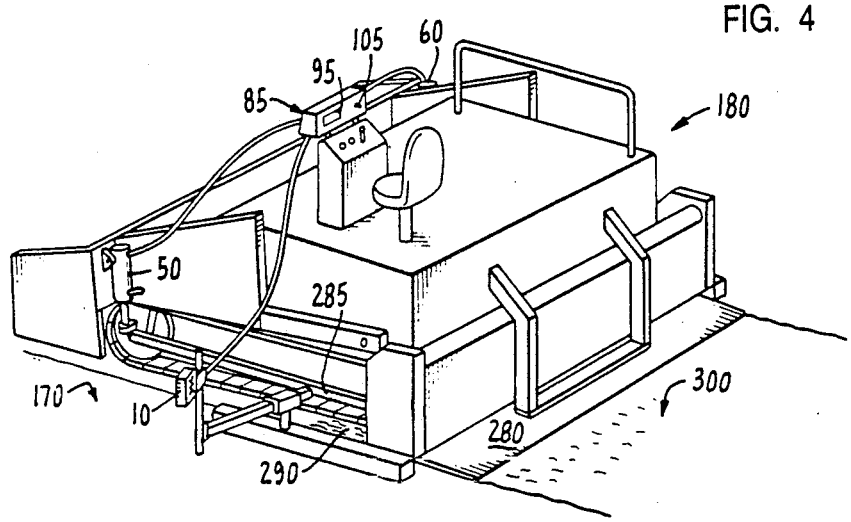
FIG. 5 is a perspective view of a paver utilizing the invention.

The apparatus of the invention may also be used on a paver 180, as depicted in FIG. 5, in essentially the same manner as on the grader 30, with certain differences to be described below. References to the grader 30 herein may be taken as references also to the paver 180, with the differences in the paver embodiment being preferred but not required for the operation thereof utilizing the present invention. The paver embodiment is discussed below, after a complete discussion relating to the embodiments utilizing the grader 30.

The control box 80 shown in FIG. 1 is electrically coupled to the follower 10. The connections between the control box 80 and the follower 10 are depicted on the right side of FIG. 6, and designated as pins A–J. Thus, there are a total of ten connections, as follows. Pin A is a power connection which is connected to a power supply (not shown) via conventional voltage regulators 123 and 126, and pin F is a ground connection. Pins B, C, D and E are input connections to the control box 80 which govern the raising and lowering of the ram 50 (or the ram 60, which is governed by the equivalent lines from the follower 15). Thus, it will be seen that the follower 10 sends signals to the control box 80, which then sends control signals to the ram 50. Pins G and H are output connections for the control box, which are inputs to the microprocessor 100, whereby the operator may send manual commands to offset the blade 40 to a different height. Finally, pins I and J are utilized to control a numeric display on the control box 80 (not separately shown) relating to the height of the blade 40. This is especially useful for the INCREASE DELAY and DECREASE DELAY procedures, discussed below. Each of the pins A-J is connected via a connecting cable 190 and a connecting cable 200 (shown in FIG. 1) to the control box 80, and the connections from the control box 80 to the valve system 70 may also be contained within the connecting cable 200. The valve system 70 is connected via hydraulic lines 210 and 220 to the rams 50 and 60, respectively, as shown in FIG. 1.

When the operator powers up the system, the program contained in the EPROM 120 causes the microprocessor to automatically determine what type of control box in the family of compatible control boxes is connected to the follower 10. Various control boxes may be used, depending on the type of work being done, such as grading or paving. Thus, when an earth grader 30 is utilized, a control box 80 dedicated to that function is used, but when a paver 180 is used, a different type of control box 85 is used. Additionally, different types of control boxes may be used for a given grader 30, such as a "staged" control box or a "proportional timing" control box, which are conventional control boxes commercially available from Spectra Physics. The specific applications of these different control boxes relative to the present invention are discussed below.

In order to automatically determine what type of control box is attached, the program reads signals at pins I and J, as seen at the right side of the schematic of FIG. 6. These pins carry signals which will be referred to as quadrature signals or bits. Depending upon the configuration of the quadrature bits at these pins I and J, the microprocessor is informed that a paver box, a staged control box, or a proportional timing control box is attached.

Figure 7A:
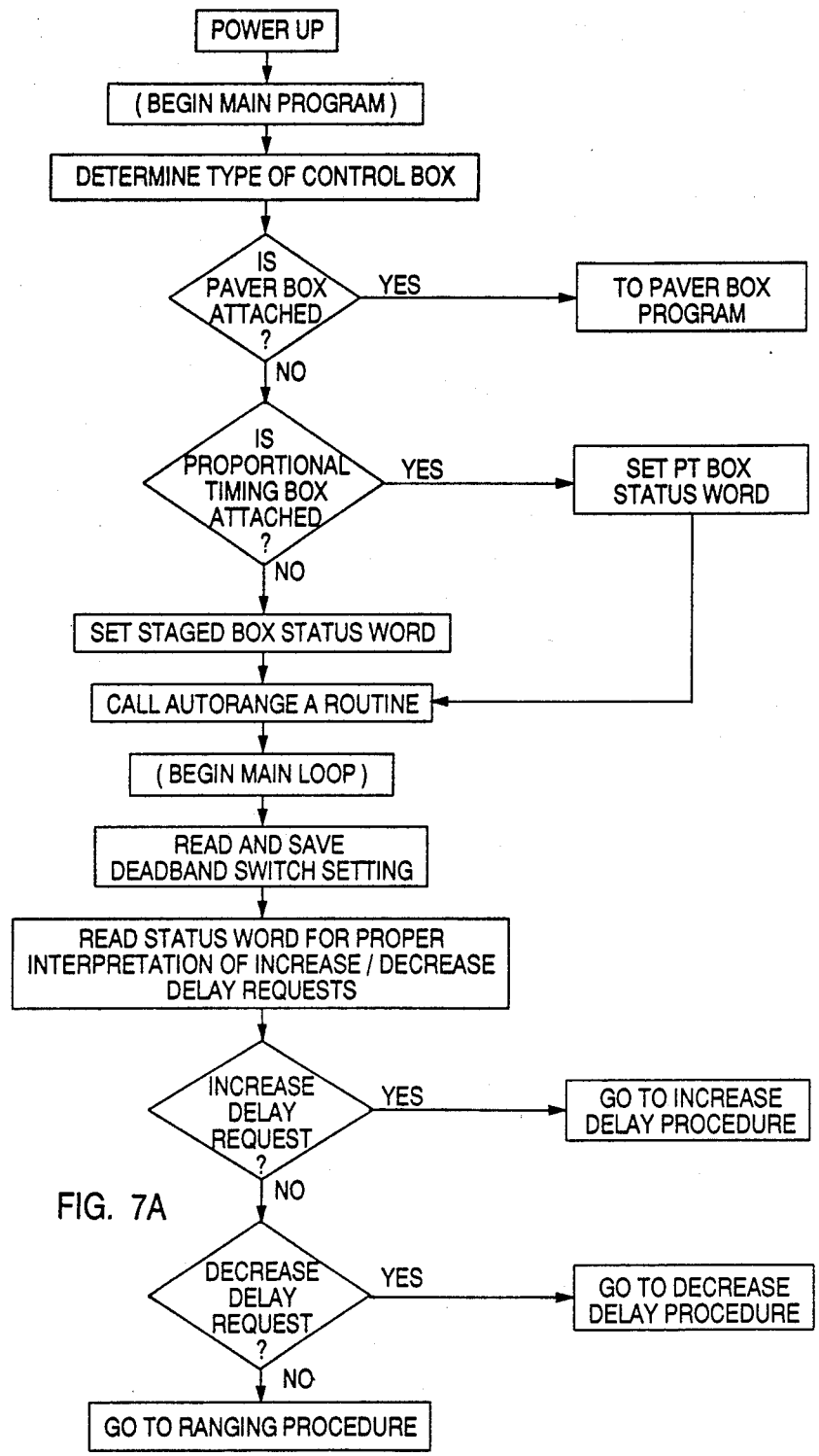
FIGS. 7A–7D, comprise a flow chart of a program implementing the invention, wherein FIGS. 7A and 7B together comprise the main program.

Referring to the flow chart of FIG. 7A, if a paver box is attached, this indicates that the follower 10 is being utilized on the paver 180, and the program branches to a paver box program, whose flow chart appears at FIG. 17, comprised of FIGS. 17A through 17D. If a proportional timing box is attached, the program sets a proportional timing (or "PT") box status word, and otherwise it sets a staged box status word. This status word is utilized later in the program to carry out certain instructions which are different for the two control boxes used on the grader 30.

As shown in the schematic diagram of FIG. 6, each of pins B, C, D, E, I and J includes a buffer (shown to the left of each pin) for buffering the signals appearing at the lines between these pins and the microprocessor 100. In addition, a standard latch is connected between the respective buffers for pins B, C, D and E and the microprocessor 100 for demultiplexing the signals on the lines for these pins.

The buffers for the lines to pins I and J are slightly different from those on the lines to pins B, C, D and E, in that the former include diode circuitry—namely diodes CR11 and CR12 for the pin I buffer, and CR9 and CR10 for the pin J buffer—for accommodating the aforementioned uses of different types of control boxes. If the flexibility of accommodating different types of control boxes is not desired, then these diodes may be omitted.

Figure 8:
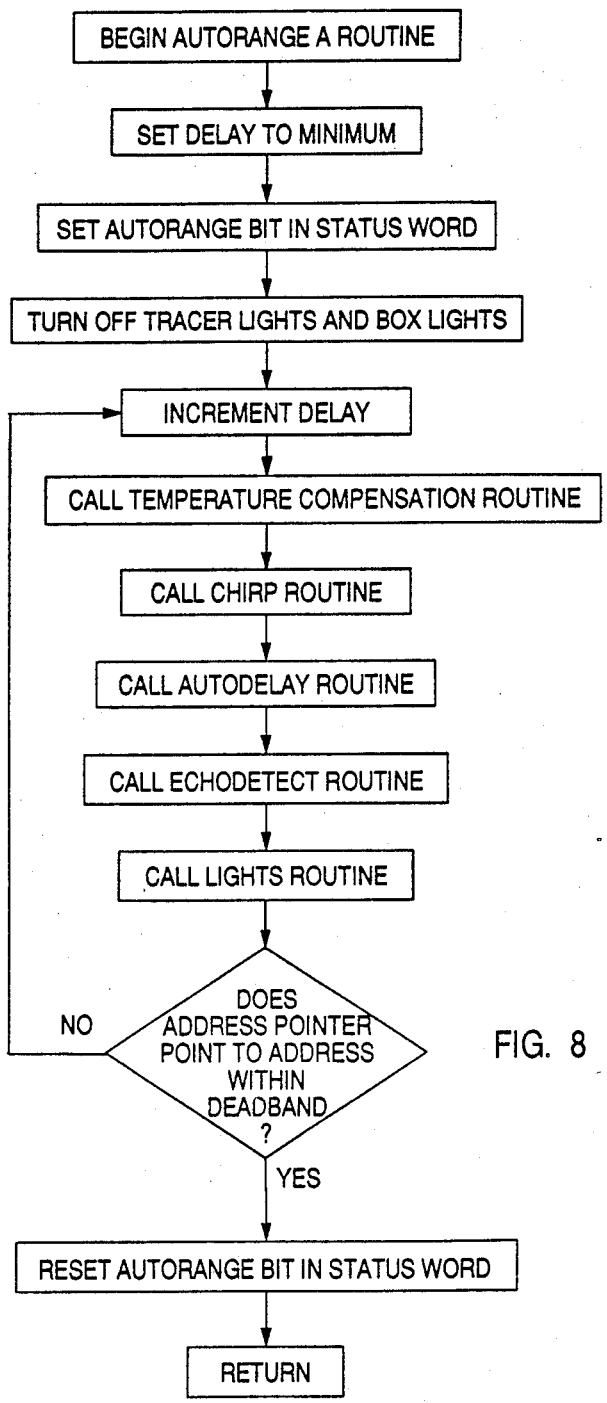
FIG. 8 is a flow chart of the AUTORANGE A routine which is call by the program of FIG. 7.

Continuing to follow the flow chart of FIG. 7A, and assuming a staged box or PT ("proportional timing") box is attached, the program then calls the AUTORANGE A routine, which is depicted in the flow chart of FIG. 8. This routine in effect determines the amount of time an acoustic chirp requires to travel from the follower 10 to the reference surface 170 and back again to the follower 10. Basically, a chirp is first emitted from the follower 10 in a known manner, and a countdown is begun, with the length of the countdown depending upon the value of a variable which may be referred to as the DELAY variable. Once the countdown of DELAY is finished, a countdown by decrementing the accumulator (which has previously been initialized with an initial count) is begun, and at the same time an interrupt pin (MP6 of the microprocessor 100 as shown in FIG. 6) is enabled in order to detect the reflected chirp at the follower 10. As will be understood from the detailed discussion of the AUTORANGE A routine immediately following, the DELAY variable is first set at a minimum and is repeatedly incremented until the reflected pulse is received at the follower 10 at a given point of time during the decrementation of the accumulator.

Figure 2:
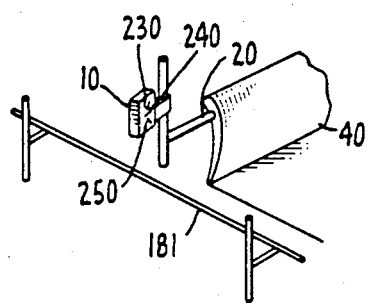
FIG. 2 is a perspective view of the follower of the invention following a string line.
Figure 3:
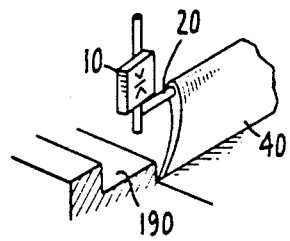
FIG. 3 is a perspective view of the follower of the invention following a curb.

Specifically, in the preferred embodiment, the DELAY variable is adjusted so that, when DELAY has been fully decremented, the chirp is sent out and interrupt pin MP6 is enabled, and then the accumulator decrementation is begun, such that the reflected pulse will reach follower 10 exactly when the accumulator value is 121 (although other values may be chosen; this is for one specific embodiment). The accumulator is an 8-bit register with a capacity to represent numbers in the range of 0 to 255. The number in the accumulator at the time the chirp echo returns and causes an interrupt is utilized as an address to a look-up table stored in the EPROM 120 (hereinafter referred to as the "control table"). The control table contains data relating to actions to be taken by the ram 50 and the ram 60. These control words are fed to the control box via the pins B, C, D and E in FIG. 6, and to follower lights or lamps 230, 240 and 250, as depicted in FIG. 2. The lines to the follower lamps are shown as lines L1, L2 and L3 in FIG. 6, and are output from the pins MP35, MP36 and MP37 from the microprocessor 100. The data stored in the control table are to be utilized by the main program to send instructions to the ram 50 as to whether to raise or lower the frame 20 and the blade 40. Since the AUTORANGE A routine is effectively a calibration routine, it is desirable—once given a blade depth, is chosen by the operator, relative to the reference surface 170—to manipulate the DELAY variable such that the accumulator will be at a particular value when the reflected chirp is received at the follower 10, such that the accumulator value at that time may be used as an address for accessing a control word in the control table which relates to a zero adjustment command to the ram 50. The control table also includes control words relating to commands or instructions to raise or lower the frame 20 and blade 40, which are contained at, respectively, higher or lower addresses in the control table. The address 121 mentioned above was chosen because it is near the center of the 8-bit control table, and thus provides for approximately equal numbers of "raise" and "lower" instructions above and below it in the control table.

Referring to FIG. 8, the AUTORANGE A routine thus first sets the variable DELAY to a minimum value and then sets a bit, to be referred to as the autorange bit, in the status word. (Alternatively, it may be preferable to utilize a separate register in the EPROM 120 for this purpose.) Then, the AUTORANGE A routine sends a signal via the lines L1, L2 and L3 and pins B, C, D and E to the follower lights, and to the control box, respectively, comprising commands for the lights on the follower and the control box to be turned off. The control box 80 preferably includes an array of lights corresponding to the follower lights 230, 240 and 250, which are turned on in a variety of patterns to indicate whether the reference ground level has either risen, or stayed at the originally calibrated level, or fallen, and thus indicates the action being taken by the program (such as raising or lowering the frame and blade) to compensate.

Figure 9:
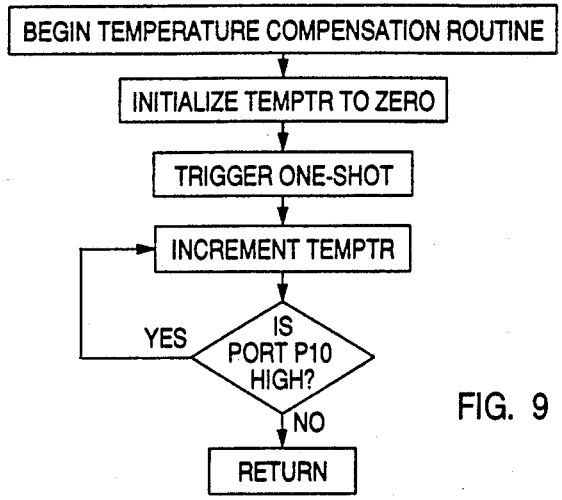
FIG. 9 is a flow chart of the TEMPERATURE COMPENSATION routine called by the program of FIG. 7.

At the beginning of the loop shown in FIG. 8, the AUTORANGE A routine then increments the DELAY variable, and calls the TEMPERATURE COMPENSATION routine, the flow chart for which is depicted in FIG. 9. The microprocessor 100 first initializes a variable TEMPTR to zero, and then sends a signal over the MP38 signal line to trigger input T2 of the one-shot 160, as shown in the lower left of the schematic diagram of FIG. 6. The one-shot 160 is preferably a standard LM555 timer integrated circuit. The reset port T4 and control port T5 are left floating, i.e., do not take part in the current operation.

The threshold pin T6 of the timer 160 is normally held at ground at the discharge pin T7. The thermistor 150 is normally held at its upper end (as seen in the schematic of FIG. 6) at 5–6 volts, as indicated by the upward arrow (which is standard throughout the schematic for $V_{cc}$ or the supply voltage—as are the downward arrows, which indicate ground). As the trigger T2 is activated, the threshold pin T6 is disconnected from ground by the pin T7, thus allowing capacitor C12 to charge. While the capacitor is charging, the value of TEMPTR in the microprocessor is repeatedly incremented at a predetermined rate. At the time of the trigger event, the output T3 from the one-shot 160 to port MP10 of the microprocessor 110 is made active. Once the charge on the capacitor C12 reaches the voltage level of the threshold at T6, or about 4 volts, the discharge pin T7 is forced to ground by pin T6, and the output T3 is deactivated, i.e. is driven low. The microprocessor detects the deactivation of T3 by polling port MP10 to determine when it is low, and on that event, stops the incrementation of the contents of the register TEMPTR; thus, the final value stored in register TEMPTR represents the total amount of time which was required for the capacitor C12 to charge to the threshold value which is indicative of the air temperature and the air density. This length of time depends upon the resistance of the thermistor 150, which is a function of the temperature. As the temperature goes up, the resistance of the thermistor decreases, and the time for the capacitor C12 to charge goes down; and conversely, as the temperature decreases, the length of time for the capacitor to charge increases. Therefore, the length of the pulse output to the port P10 (i.e. the time value of TEMPTR) is inversely proportional to the ambient temperature. This value is utilized (as discussed in detail below) to adjust the amount of delay time implemented by the AUTODELAY routine of FIG. 11.

From the above, it will be understood that the temperature compensation routine returns a value for TEMPTR which represents the temperature of the environment in which the follower 10 is operating. This is important, because the speed of sound, upon which the follower rangefinding depends, changes with temperature.

Figure 10:
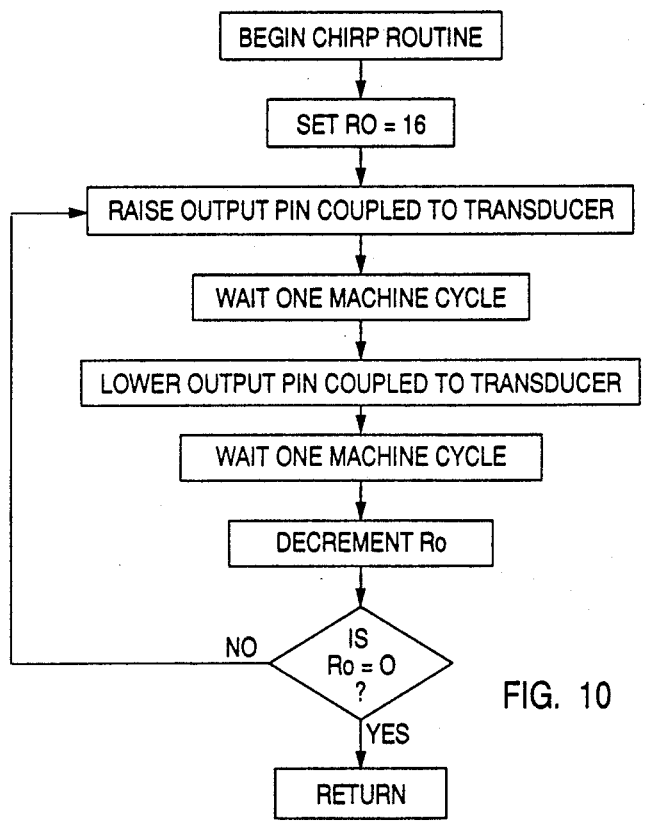
FIG. 10 is a flow chart of the CHIRP routine called by the program of FIG. 7.

The AUTORANGE A routine then calls the CHIRP routine, whose flow chart is depicted in FIG. 10. The purpose of the CHIRP routine is simply to emit a series of acoustic pulses. First, a register $R_0$ is set at 16, and then a loop is entered whereby a series of acoustic pulses are emitted from the transducer 130. In order to accomplish this, the output pin MP30, which is coupled to an input of the transducer 130, is raised, and the program causes a delay of one machine cycle (or more, depending upon the particular application). Then the pin MP30 is lowered, and another machine cycle is waited. Then the register $R_0$ is decremented, and this series of steps is repeated until $R_0$ reaches zero. Finally, the CHIRP routine returns to the AUTORANGE A routine.

Figure 11:
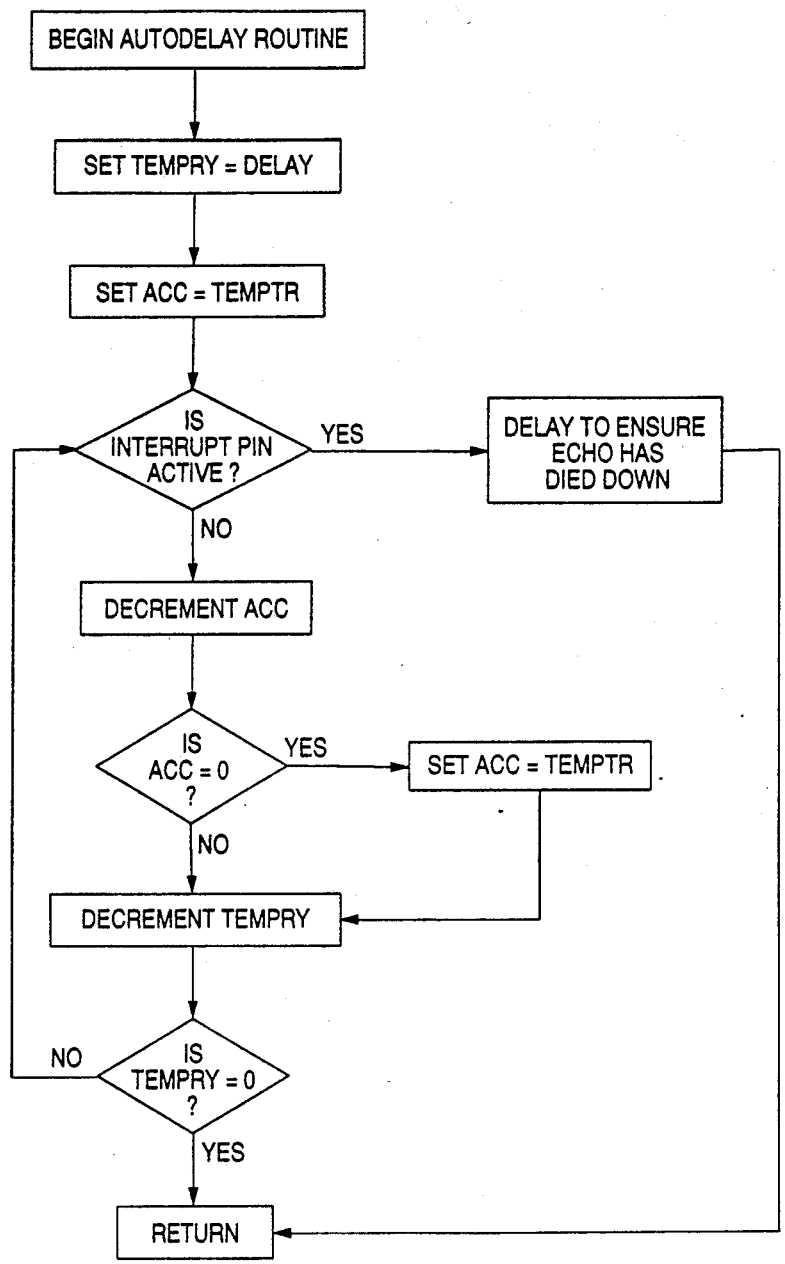
FIG. 11 is a flow chart of the AUTODELAY routine called by the program of FIG. 7.

The next routine called by the AUTORANGE A routine is the AUTODELAY routine, whose flow chart is depicted in FIG. 11. It will be recalled that the variable DELAY was initialized to a minimum, and then incremented once, as shown in FIG. 8. At this point, following the flow chart of FIG. 11, the AUTODELAY routine sets a temporary accumulator variable TEMPRY to equal the value of the DELAY variable. Then, another accumulator (referred to as ACC) is set to TEMPTR, which was obtained from the TEMPERATURE COMPENSATION routine. The remaining steps in FIG. 11 cause the program to delay for the amount of time necessary to decrement the DELAY register to zero, as adjusted by the temperature value stored in TEMPTR. Since the value of TEMPTR is inversely proportional to the temperature in the vicinity of the follower, the AUTODELAY routine causes a time delay which is longer for higher temperatures (which correspond to shorter values of TEMPTR), and is shorter for lower temperatures.

As the DELAY countdown is undergone during the AUTODELAY routine, it is possible that the chirp emitted during the CHIRP routine will return to the transducer. In case this happens, as indicated in FIG. 11, the program periodically checks a pin MP6 of the microprocessor 100, which is activated when a comparator 260 of the analog receiving section 140 finds that an echo has been returned to the transducer 130. If such an echo (i.e., the reflected chirp) has been received, the transducer 130 provides a signal over line 270 to the analog receiving section 140, which effectively acts as an amplifier for this signal for input at the proper voltage to pin MP6. If the interrupt pin MP6 is found to be active before the loop shown in FIG. 11 is completed, a delay is executed to ensure that the chirp echo has died down, and then a return to the main program is executed. The microprocessor can detect when there is an active interrupt signal at MP6 even when the pin is not enabled. However, the interrupt service routine is not performed until MP6 is enabled and an interrupt signal is active The purpose for this delay and return from the AUTODELAY routine is discussed below.

If, however, the interrupt pin is not found to be active during the loop of FIG. 11, the AUTODELAY routine proceeds to decrement the accumulator variable ACC, then test it for zero. If it is not zero, it then decrements TEMPRY, and also tests this for zero. Once ACC is found to be zero, it is reset to the TEMPTR variable, and the loop of FIG. 11 proceeds. This loop is repeated until TEMPRY reaches zero, during which time the accumulator variable ACC may have reached zero anywhere from one to very many times.

It will be understood that, the lower the value of TEMPTR, the more times the value of ACC reaches zero in the loop of FIG. 11; and since each decision-making process or step takes a certain amount of time, the lower the value of TEMPTR, the longer the AUTODELAY routine takes to cycle through the loop. Conversely, the higher the value of TEMPTR, the longer the AUTODELAY routine will take to cycle through its loop. In effect, by repeatedly resetting ACC to the value of TEMPTR and decrementing it to zero, the AUTODELAY routine multiplies the delay which would otherwise be incurred simply by decrementing the value of DELAY by a factor which is directly related to the actual ambient temperature. This results in a total time of implementing the the AUTODELAY routine which is automatically temperature compensated. The actual compensation factor resulting from the value of TEMPTR can be set as desired by utilizing no-operation steps to a greater or lesser degree in the ACC reinitialization branch of the loop in AUTODELAY.

Other factors affecting the accuracy of prior devices include humidity, air pressure or density, altitude above sea level, and any other variables which may affect the speed of sound in air. Thus, the TEMPERATURE COMPENSATION routine may be broadened to compensate for such other variables using methods analogous to the method for correcting for temperature changes.

Figure 12:
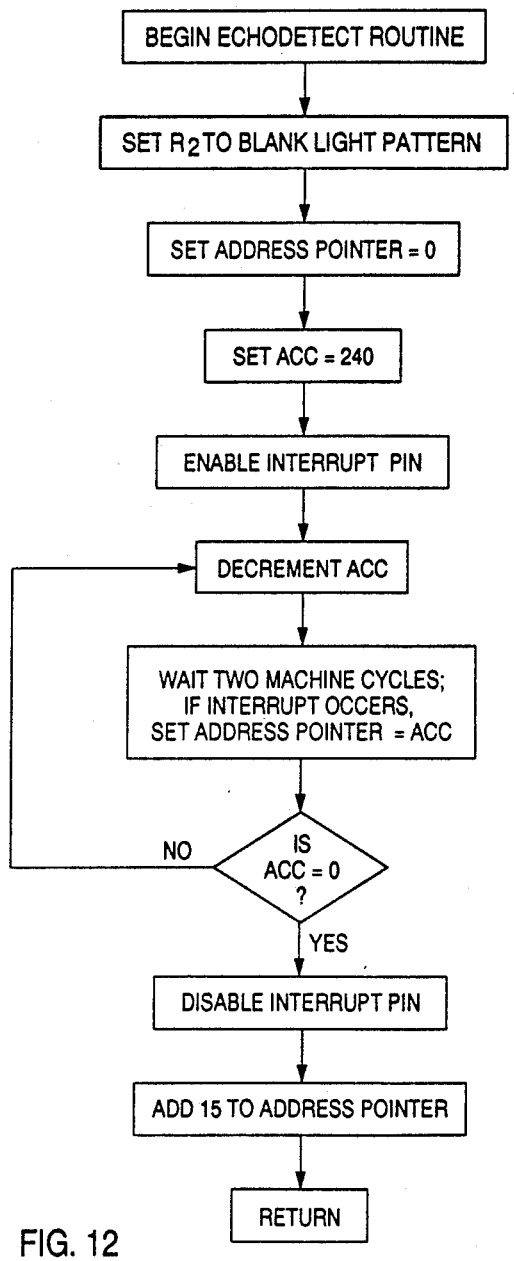
FIG. 12 is a flow chart of the ECHODETECT routine called by the program of FIG. 7.

The ECHODETECT routine of FIG. 12 is then implemented. This routine serves to determine the echo time for the chirp This routine utilizes the accumulator ACC, in effect, as a countdown timer, setting it first to a certain maximum (in the preferred embodiment, 240), and then decrements ACC repeatedly, meanwhile testing pin MP6 for whether an echo interrupt occurs during the countdown. If such an echo interrupt occurs, an address pointer which will later be utilized to access the control table is set for the value of ACC at the time of the interrupt, and thus relates to the point in time at which the echo interrupt was received.

In order to accomplish this, the ECHODETECT routine first sets a register $R_2$ to a blank light pattern; that is, $R_2$ is used to store data, which, when output to the follower (and, optionally, also to the control box, causes none of the lights of those displays to be energized. Then, a variable address pointer is set to zero, and ACC is set to a constant equal to 240. The interrupt pin MP6 of the microprocessor 100 is then enabled in a standard fashion. This pin is a standard feature of the 80C39HC microprocessor, and functions such that, when a signal is received at the pin MP6 while it is enabled, a jump to an interrupt service routine is immediately executed.

A loop as depicted in FIG. 12 is then begun, which first decrements ACC, then waits a certain amount of time (two machine cycles in the preferred embodiment). If an interrupt occurs at the interrupt pin MP6 during this loop, the value of the address pointer is immediately set equal to the accumulator value at the time of interrupt, and the accumulator decrementation loop is continued until ACC reaches a zero value. Then the interrupt pin MP6 is disabled, and the value of 15 is added to the address pointer. The purpose of this last step is to accommodate certain program steps, which, in the preferred embodiment, are actually stored at the lowermost 15 locations of the address pointer. This is, of course, simply a design feature which may be altered in other embodiments.

At the completion of the ECHODETECT routine, one of three situations has occurred. The first possibility is that the interrupt pin MP6 was found already to be active at some point during the AUTODELAY routine, in which case the AUTODELAY routine immediately returned to the main program, and the ECHODETECT routine was begun, as previously explained. Examining the flow chart of FIG. 12, it is seen that the address pointer would then be set to zero, the accumulator would run through its decrementation loop, and, since an echo was already received, necessarily no further interrupt could occur during the decrementation loop. The delay which is implemented by the AUTODELAY routine to ensure that the echo had died down also ensures that no latter part of the chirp could cause return from the loop of the ECHODETECT routine, if an echo has already been received during the AUTODELAY routine, thus causing a return from the routine. Since no interrupt occurs during the loop of the ECHODETECT routine of FIG. 12 in this first hypothetical situation, the address pointer is never set to the accumulator value, and at the end of the ECHODETECT routine, the constant 15 is added to the address pointer (which had been initialized at zero) such that, upon exiting the ECHODETECT routine, the value of the address pointer is 15.

The second hypothetical situation which could occur is, of course, that an interrupt was received during the decrementation loop in FIG. 12, in which case the address pointer is equal to the accumulator value at the time of interrupt, 15 is added to the address pointer, and this determines the final value of the address pointer upon exiting the ECHODETECT routine.

The third hypothetical situation which could occur is that no echo was received at all, either during the AUTODELAY routine or the ECHODETECT routine, and thus, once again, this would result in a value of 15 for the address pointer.

Only if an echo is received during the ECHODETECT routine is the reference plane within range for a "lock-on". Outside this range, the system generates error signals indicating the "out-of-range" condition and the direction of the error.

Figure 13:
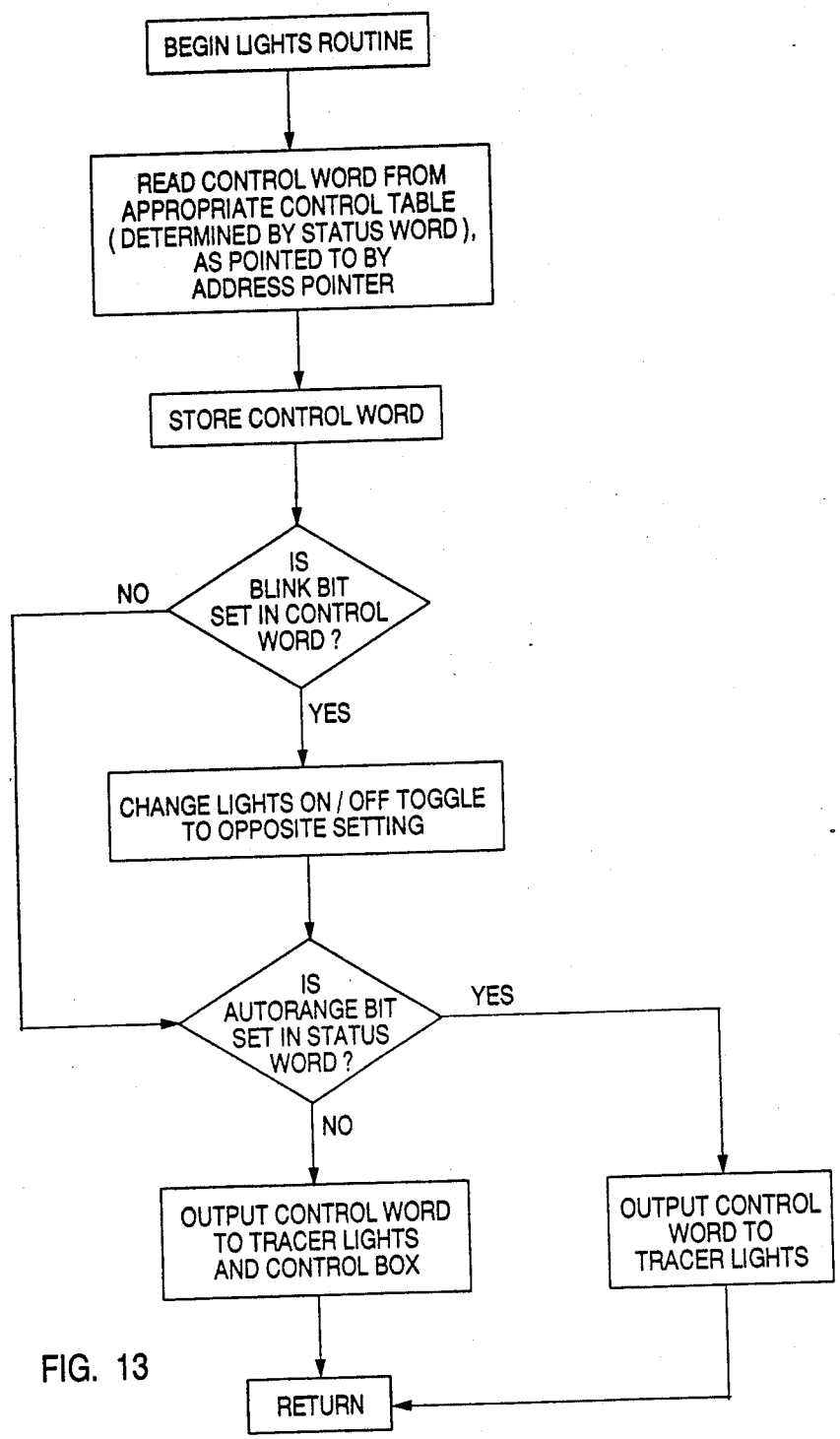
FIG. 13 is a flow chart of the LIGHTS routine called by the program of FIG. 7.

Following the return from the ECHODETECT ROUTINE, the value of the address pointer is utilized in the LIGHTS routine of FIG. 13, which is the next routine to be called by the AUTORANGE A routine. First, depending upon the status word which was set near the beginning of the main program (see FIG. 7A), relating to whether a staged box or a PT box is in use, the appropriate control table is accessed. In the preferred embodiment, there is one control table relating to the staged box, and a different control table relating to the PT box, both of which tables are contained in internal memory in the EPROM 120. The control word points to the appropriate control table, and the address pointer points to the appropriate control word in that table.

Figure 15:
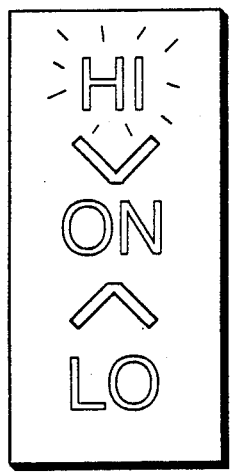
FIG. 15 shows a display used by the staged control box of the invention.
Figure 16:
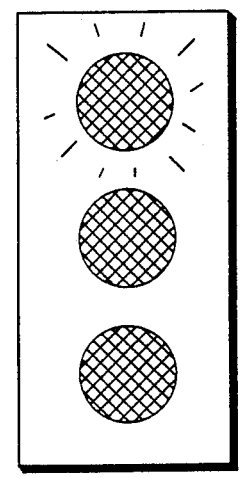
FIG. 16 shows a display used by the follower of the invention.

The control word, as discussed above, contains data relating to instructions to the follower as to whether to light up particular patterns of light corresponding to changes in the height of the reference ground surface 170. Similarly, the control word contains bits relating to the display on the control box, and simultaneously relating to actions to be taken by the rams 50 and 60 to accommodate such changes in the level of the reference ground surface 170. In the preferred embodiment, the light display (which may alternatively be an LCD display) on the control box appears as follows. If it is determined (in a manner to be described below) that the reference ground surface 170 has fallen past a certain point relative to the calibrated level, then on the control box a light or LCD symbol HI is lit up (to indicate that the blade is at too high a level, i.e. is grading at an offset less than the chosen offset). This is depicted in FIG. 15. This would correspond to an upper light (which is preferably yellow) which would be lit up on the follower or on the PT control box, as depicted in FIG. 16.

In the preferred embodiment, the control words in the control table are arranged in bands corresponding to "in-the-green" locked-on condition, and to high coarse, low coarse, high fine and low fine adjustment conditions. This renders the follower compatible with the preexisting family of Spectra Physics control boxes. In alternative embodiments, a linear array of control words which alter the blade position linearly as a function of the displacement from the center of the green or locked-on condition could be used. Such an embodiment would require a different type of controller or would require additional interface circuitry in the follower itself to allow the follower to directly control the hydraulic valves controlling the blade control hydraulic rams.

The preferred embodiment works as follows. Referring to FIG. 6, such a signal to the staged and PT boxes might, for instance, correspond to pin E being activated, with pins B, C and D not being activated. Thus, when pin E is activated and pins B, C and D are not activated, the light pattern is as in either FIG. 15 or 16, and the appropriate signal is also sent by the control box to the valve system 70. The blade 40, and hence also the frame 20, is thereby raised by a predetermined amount. Alternatively, the signal and the valve system might be configured to adjust the blade height for a certain period of time at a certain adjustment velocity. The desired result is to make adjustments to the blade corresponding to the control words which are accessed, thus compensating for changes in the height of the reference surface.

Similarly, if a low signal is received, the "LO" light in FIG. 15 is turned on, or the lower light (depicted as the lowermost circle) in FIG. 16, which is again preferably yellow, is energized. This is to indicate that the blade is at too low a level relative to the reference surface, i.e. is grading at an offset greater than the chosen offset. At the same time, a low adjustment instruction is sent to the valve system 70 and thence to the ram 50, and the frame 20 and blade 40 are thereby raised by a predetermined amount.

The other possibilities for adjustments to the ram 50 lie between these extremes. For instance, if the reference ground surface 170 is slightly higher than the calibrated level, then perhaps only pin D of FIG. 6 would be activated, which would relate to a high fine adjustment. This preferably corresponds to the downward-pointing arrow and the "ON" symbols being blinked on and off or, alternative, in the PT control box, blinking the upper yellow light. The activation of only pin C would then correspond to a low fine adjustment, and would result in blinking of the upward-pointing arrow and the "ON" symbol in FIG. 15 or blinking the lower yellow light in FIG. 16. If both pins D and C are activated, this would relate to a situation where the reference ground surface was still substantially at its original level, and in the preferred embodiment would result in a display as in FIG. 15, where only the "ON" symbol blinked, or the center light (depicted by the center circle in FIG. 16) of the PT control box blinking. Preferably, the center light of FIG. 16 is a green light.

With the staged control box, an additional two possibilities are accommodated, namely that pins E and D are both energized, in which case the "HI" symbol and the downward-pointing arrow are both blinked, or pins B and C are both energized, in which the "LO" and the upward-pointing arrow in FIG. 15 are blinked. These situations would correspond to combination high-coarse/high-fine and low-coarse/low-fine adjustments, respectively, to the height of the blade and 40 frame 20, with the high-coarse/high-fine adjustment being intermediate the high-coarse adjustment and the high-fine adjustments, and similarly with the low-coarse/low-fine adjustment being between the low-fine and low-coarse adjustments.

Thus, one reason for utilizing different control tables for the staged box and the PT box is that the staged box display and ram adjustments allow for seven different states to be detected and correspondingly adjusted, i.e., high-coarse; high-coarse/high-fine; high-fine; high-fine/low-fine (which results in no adjustment); low-fine; low-fine/low-coarse; and low-coarse. The PT box, on the other hand, simply has high-coarse; high-fine; high-fine/low-fine (i.e., no adjustment); low-fine; and low-coarse. Other implementations are, of course, possible utilizing different configurations of control bits from the control word output to the pins B, C, D and E, and utilizing different types of coarse and fine upward and downward adjustments.

At the same time that the pins B-E are energized for sending instructions to the control box, three bits are sent to the follower 10 over the lines L1, L2 and L3, as seen in FIG. 6, which energizes the lamps of the follower 10 in the same manner as the display of the PT control box, as shown in FIG. 16. The control word is an 8-bit word, and thus the bits output to pins B-E utilized four of these bits, whereas the bits output on lines L1-L3 utilize another three bits. The remaining bit is retained internally within the microprocessor 100 and may be referred to as a "blink bit" and controls whether the lamps of the follower blink on and off, or are simply energized on or turned off. In the preferred embodiment described above, only for the high-coarse and low-coarse situation are the upper- and lowermost lamps energized in a constant ON state; otherwise the appropriate lamps are blinked. Thus, where the reference ground surface 170 is detected to be considerably high or considerably low, the blink bit will be off; otherwise it will be on.

Now, referring back to the LIGHTS routine flow chart of FIG. 13, once the control word which is obtained from the appropriate control table is stored in register $R_2$, the LIGHTS routine tests for whether the blink bit is set in the control word. If it is set, an internal light-on/lights-off toggle of the microprocessor 100 is set to the opposite setting of its current position. Thus, if in a previous cycle the lights were blinked on, they will now be blinked off, and vice versa. If the blink bit is not set in the control word, this step is bypassed.

The LIGHT routine then tests for whether the autorange bit is set in the status word, which is the case at present, since this bit was set in the status word in the beginning of the AUTORANGE A routine. If this bit is set, then, the control word is output to the follower lights only, and not to the control box. As will be seen below, the lights routine is also utilized in the main program, and the controls to the ram 50 via the control box 80—and indeed the displays of FIG. 15 and 16 on the control box—are given instructions via pins B-E, as discussed above.

Once the control word is output to the follower lights in the LIGHTS routine, the program returns to the main line of the AUTORANGE A routine, and a test is conducted for whether the address pointer points to an address of the control table within a "deadband," the width of which may be set by the operator. As mentioned above, in the preferred embodiment, location 121 of the control table contains a control word indicating that no adjustment to the ram 50 should be taken, i.e., the "center of the green band"; this corresponds to the blinking of the green light on the follower 10. There are preferably several locations, however, which contain the same control word, centered around address 121 of the control table. For instance, addresses 120, 121 and 122 all may contain no-adjustment control words (which may be referred to as "green" control words) or, alternatively, locations 116-126 may all contain "green" control words. The number of addresses surrounding the chosen "center" address of 121 which contains "green" control words is thus referred to herein as the "deadband." A switch is preferably provided on the follower 10 (or, optionally, on the control box 80) to allow the operator of the grader 30 to choose which deadband he prefers, in the sense that the operator may control which control table is being used with each control table having a different deadband width, i.e., a different number of "green" control words which include no adjustment signals to alter the blade height. If a very precise job is required, the smallest deadband may be chosen, and for the average job, for instance, a medium deadband may be chosen. For coarse grading, a coarse deadband may be chosen. In the preferred embodiment, the deadband switch setting is stored as a part of the status word, although it may be stored as a separate variable.

The deadband select bits appear at lines DB3 and DB6 of FIG. 6, and a switch 281 is also shown, connected to input pins MP33 and MP34 of the microprocessor 100. It will be understood that with two bits available, three deadband selections may be accommodated.

Thus, in the AUTORANGE A routine, the test is conducted as to whether the address pointer points to an address within the chosen deadband. If so (for instance, if the address pointer points to location 121), then the autorange bit is reset (i.e., activated) and the AUTORANGE A routine is exited, returning to the main program. For this to be the case, the delay implemented by the AUTODELAY routine, which depended upon the instantaneous value of the DELAY variable plus the time taken to decrement the value of ACC in the ECHODETECT routine to the value of 121, would have to have equalled exactly the time taken by the chirp to travel from the follower 10 to the reference ground surface 170 and back again to follower. to provide an interrupt signal at the interrupt pin MP6. On the first pass through the AUTORANGE A routine, the DELAY variable will be at a minimum, plus a single incrementation. If this delay, plus the time taken for the accumulator to decrement to a value within the deadband range (such as addresses 120-122) during the ECHODETECT routine, is too short, then the address pointer will not be found to point to an address within the deadband at the bottom of the loop of the AUTORANGE A routine, as seen in FIG. 8, and the loop will be repeated with a higher value for DELAY. This loop is repeated again and again, until finally the value for DELAY is just right, such that the delay implemented by the AUTODELAY routine, plus the time taken for the accumulator to reach a "deadband" value during the ECHODETECT routine, equals the amount of time taken for the chirp to be emitted from the follower 10 (by the CHIRP routine) and to be reflected back to the follower. At this point, when the test for whether the address pointer points to an address within the deadband is conducted by the AUTORANGE A routine, the answer will be "yes," and a return to the main program will be executed. Therefore, the net result of the entire AUTORANGE A routine is to set a value for DELAY to ensure that this result occurs, in effect calibrating the follower for the particular height of the reference surface 170 at the time of autoranging.

Referring again to the flow chart of FIG. 7A, the main loop of the program is now begun. First, the deadband switch setting, discussed above, is read and saved for use during the upcoming ranging procedure. Then the status word (staged or PT box) is read to implement proper interpretation of requests for increasing or decreasing the value of DELAY by the INCREASE DELAY and DECREASE DELAY procedures of FIGS. 7C and 7D. These procedures will be discussed below, after the following discussion on the remainder of the main program.

Figure 7B:
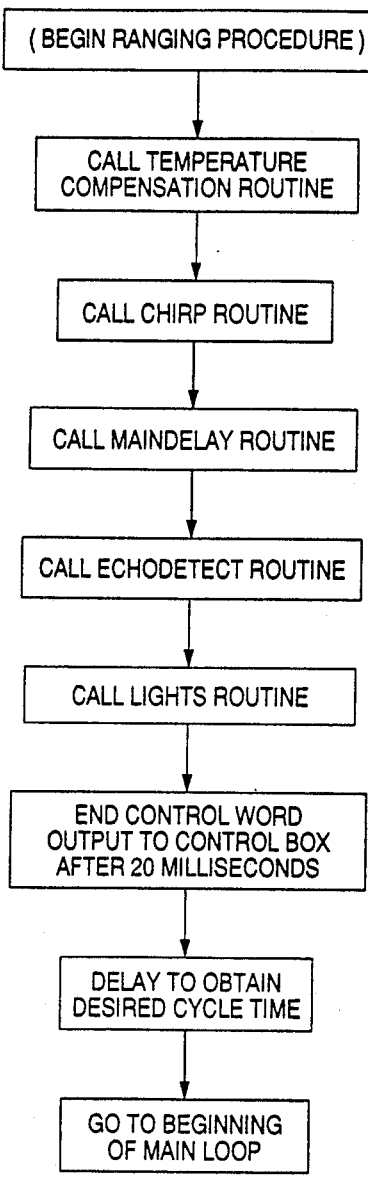

Assuming for the moment that no increase or decrease delay requests are made by the operator, the main program proceeds to the ranging procedure of FIG. 7B. This procedure is used to detect changes in the height of the reference ground surface 170 (or the string line 181, or the curb 190) and thereupon raise or lower the blade 40 to keep it at a constant offset. Thus, first the TEMPERATURE COMPENSATION routine is called, to determined a new value for the variable TEMPTR (or an unchanged value, if the temperature has not changed). An alternative temperature compensation procedure, both for the AUTORANGE routine and the main loop, utilizes an empirically determined temperature compensation curve stored in memory, so that for a given temperature as detected by the thermistor 150 or other means for temperature detection, the program is directed simply to retrieve the appropriate correction factor from the compensation curve, without the need for the one-shot 160. The program would then simply multiply the value of DELAY, or would otherwise correct for temperature depending upon the nature of the compensation curve data, before implementing the MAINDELAY (or AUTODELAY) routine.

Figure 14:
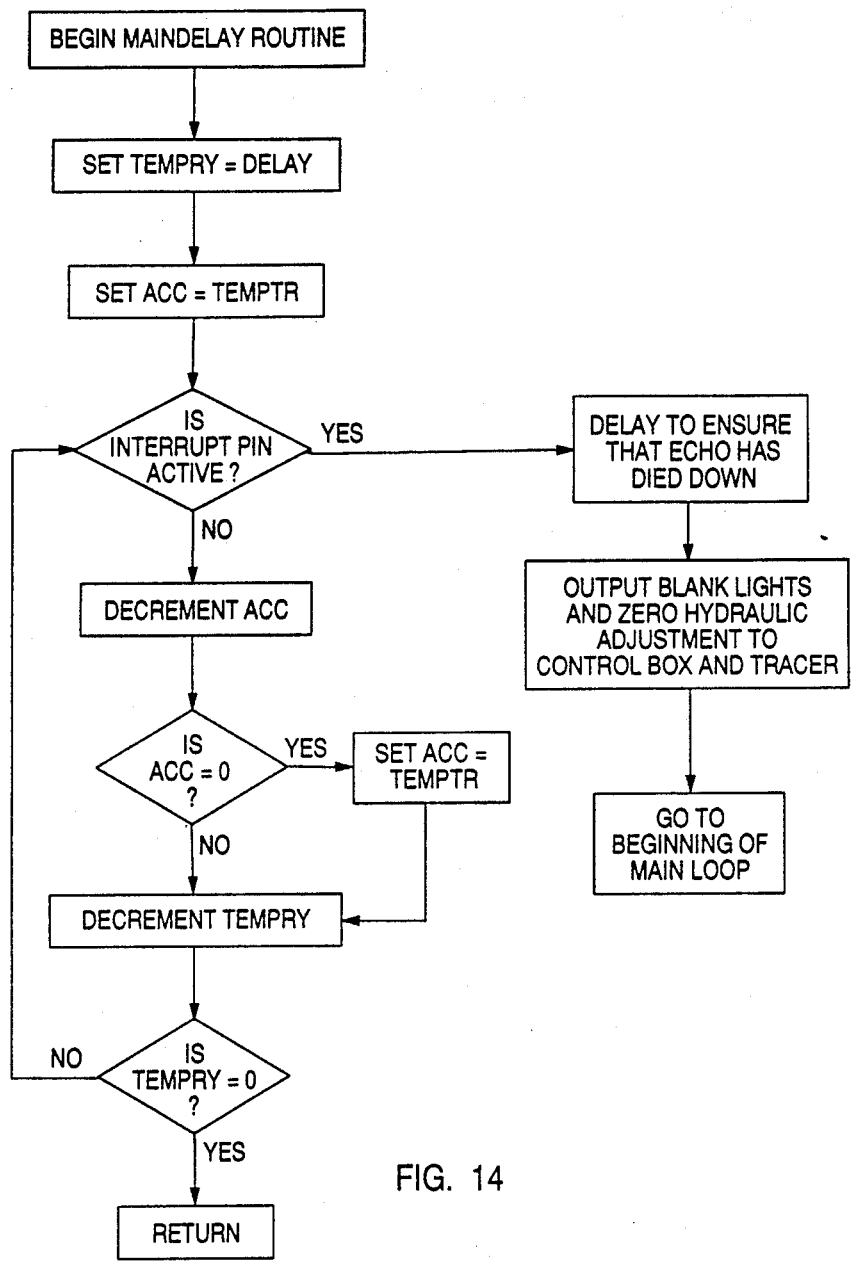
FIG. 14 is a flow chart of the MAINDELAY routine called by the program of FIG. 7.

The CHIRP routine is then called to emit a chirp from the follower 10. At this point, a routine entitled MAINDELAY is implemented, as depicted in the flow chart of FIG. 14. This routine is similar to the AUTODELAY routine, with the difference lying in the steps to be taken if the interrupt pin MP6 is found to be active sometime during the decrementation loop of the MAINDELAY routine. If MP6 is found to be active during the decrementation loop, then a delay to ensure that the echo has died down is implemented (just as in the AUTODELAY routine), but then the program instructs the control box and follower via the appropriate signal lines to blank out their displays, and a zero hydraulic adjustment command is provided to the ram 50 by the control box. It will be understood that, if the interrupt pin MP6 is already active before the delay implemented by this routine (which depends upon the DELAY variable) can be accomplished, this means that the reference surface is closer to the follower than when the value for DELAY was set, since the echo is returning sooner than for the calibration of DELAY during the AUTORANGE A routine. If the reference surface 170 rises a small amount, this will cause the accumulator during the ECHODETECT routine to decrement a lesser amount when the echo is received, and if the accumulator has decremented to some value between 255 and the top of the deadband (such as 122), then the appropriate high-coarse or high-fine control word will appear at the control table location addressed by the address pointer. If, however, the reference surface 170 rises a large amount, then it is possible that the MAINDELAY routine cannot even be completed before the echo is received at the follower 10. This would, therefore, result in the situation under discussion, namely that the interrupt pin is active before the loop of FIG. 14 is completed. Blanking out the lights and instructing the ram 50 to make zero hydraulic adjustments constitutes an error signal indicated that the reference surface 170 is outside the range of the program. Of course, the range of addresses of the control table may be widened or narrowed to determine a desired range of acticty for the program. One reason for limiting the range of activity of the program would be in the case of following a string line as a reference surface. If the follower loses the string line (such as by the grader operator driving off course, or a break in the string line), the follower will detect a very low surface, namely the level of the ground beneath the string line. If no limit were placed on the range of activity of the follower, it would drive the blade very deep in its attempt to follow the ground surface.

The preferred "out of range" error signals are a blanking out of all the lights when the reference surface is too close, and lighting up both the upper and lower yellow lamps in FIG. 16 when the reference surface is too far away.

Once the lights are blanked out in the situation under discussion, the main program branches to the beginning of the main loop, as depicted in FIG. 7A, and the loop is begun again to take another reading of the reference surface 170.

Referring back to the MAINDELAY routine of FIG. 14, assuming the interrupt pin is not found to be active before the loop of this routine is completed, the accumulator (which is set to the value of TEMPTR) and the TEMPRY variable (which is set to the value of DELAY) are repeatedly decremented, just as in the AUTODELAY routine, to implement a delay which is adjusted for temperature.

Then the ECHODETECT routine is again called, with the result that an address pointer value is achieved, which relates to the time of reception of the echo at the follower 10 during decrementation of the accumulator ACC. If, for example, the reference ground surface 170 has dropped as the grader 30 moves along, then the value of the address pointer at the end of ECHODETECT will be less than 121, since the accumulator will have had more time to decrement while the echo of the chirp was returning to the follower 10. The LIGHTS routine is then called, with the result that the blade 40 and frame 20 are lowered (in this example), thus reestablishing the calibrated distance between the follower 10 and the reference surface 170. At the end of the ranging procedure in FIG. 7B, the program again branches to the beginning of the main loop and repeats this procedure, thus adjusting the blade 40 up and down constantly as the grader moves along, to accommodate changes in the reference surface.

It will be appreciated that the foregoing procedure effectively generates a first time interval (the DELAY time plus the accumulator decrementation time) which comprises a calibration for the particular blade depth (and hence follower height) chosen by the operator before autoranging. Similarly, the MAINDELAY and ECHODETECT routines in the aggregate generate a second time interval directly corresponding to the level of the reference ground surface at a place different from the calibration point, as the grader moves along the reference surface. The LIGHTS routine then in effect compares the lengths of these first and second time intervals, by way of comparing the pointer address values generated during implementation of the ECHODETECT routine, and the result of this indirect comparison is to automatically generate the raise and lower signals for the blade and frame by access to the control table.

Figure 21:
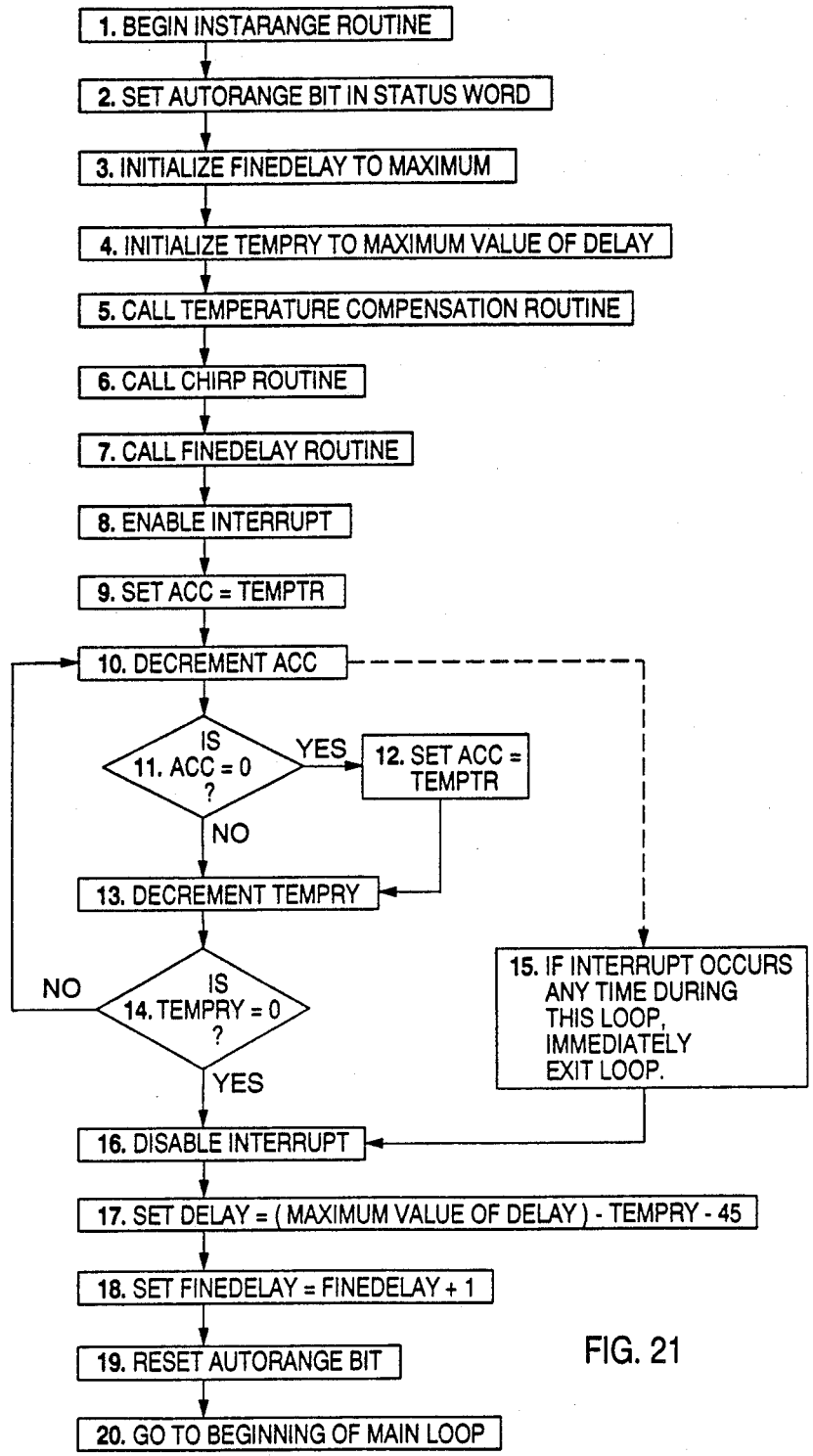
FIG. 21 is a flow chart of an alternative routine called the INSTARANGE routine.

In an alternative embodiment of the program of the invention, shown in the flow chart of FIG. 21, a calibrated value of DELAY is returned with a single pass through a routine which may be called the INSTARANGE routine. The INSTARANGE routine completely replaces the AUTORANGE A routine in the program of the invention, and is called at the point in the main program in FIG. 7A that the AUTORANGE routine would otherwise be called.

Figure 19:
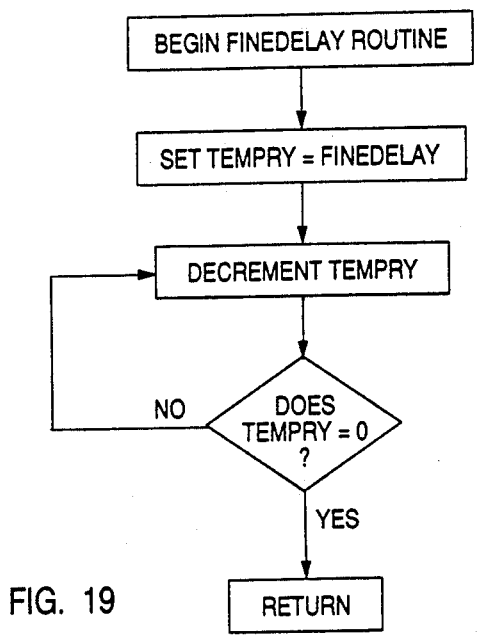
FIG. 19 is a flow chart of the FINEDELAY routine called by the program of FIG. 17.

Briefly, and as explained in detail below, in the INSTARANGE routine, a first time interval count is generated by a single counter such that it directly measures the time taken for the chirp to echo back to the follower at time of autoranging. This first time interval is then used to calculate the calibrated value of DELAY, by subtracting a value from the first time interval corresponding to the amount of time taken by the accumulator in the ECHODETECT routine to decrement from its maximum value (which may be 255, or 511, or some other value) to 121. Since the decrementation of ACC in the ECHODETECT routine of FIG. 12 proceeds in the preferred embodiment at a rate three times as fast as the decrementation of TEMPRY in the MAINDELAY routine of FIG. 14, the value of $(255-121)/3=44.67$ is subtracted from DELAY and the autoranging procedure would be a single-pass routine. However, the values of DELAY may only be integral in the present embodiment, and thus the value of 45 should be subtracted from DELAY, and the overshoot of $\frac{1}{3}$ can be accommodated in the FINEDELAY routine, whose flow chart is depicted in FIG. 19 and which is discussed in detail below relative to the paver box program of FIG. 17.

At the beginning of the INSTARANGE routine, the autorange bit is set in the status word, as indicated by box 2 of FIG. 21. Then in box 3, FINEDELAY is initialized to its maximum (which may again be chosen to be 21), and in box 4, the variable TEMPRY is initialized to the maximum value of DELAY. (As discussed in detail below, although single variables are discussed for TEMPRY and DELAY, using the teaching below a two-byte variation may be implemented, effectively extending the range of the system for a given microprocessor.)

In boxes 5-7, the TEMPERATURE COMPENSATION, CHIRP, and FINEDELAY routines are called, thus returning a value for TEMPTR and implementing the delay (after emission of the chirp) called for by the FINEDELAY variable. Then, the interrupt is enabled, and ACC is set to TEMPTR, in boxes 8 and 9. Next, the loop of boxes 10 through 16 is implemented, serving to decrement the accumulator ACC (thus compensating for temperature) while also decrementing TEMPRY. As indicated in box 15, if the interrupt from the echoed pulse occurs any time during this loop, then the loop is immediately exited, with the interrupt being disabled at box 16.

At this point, as shown in box 17, DELAY is set to the maximum value thereof minus the value of TEMPRY, minus 45. This effectively inverts the value of DELAY from that of TEMPRY, with the adjustment of 45 mentioned above. The purpose of the "inversion" is to account for the fact that the value of TEMPRY is decremented from a maximum, rather than incremented from a minimum, and is explained as follows If the value of TEMPRY was decremented by an amount X, this value (in combination with the time consumed by the FINEDELAY routine) represents the total time for the reflected chirp to return to the follower—and, of course, thus represents the distance from the follower to the reference surface for calibration purposes Since the MAINDELAY routine decrements TEMPRY from the calibrated value of DELAY to zero, it is desired to set DELAY such that the time consumed by the MAINDELAY routine of FIG. 14 represents the actual distance from the follower to the reference surface, i e X. Thus, the value of DELAY is set to the value of X by subtracting the final value of TEMPRY (upon exiting the INSTARANGE loop) from the initial value thereof, namely the maximum value of DELAY. Then, 45 is subtracted from this amount to ensure that the value returned for ACC during the ECHODETECT routine of FIG. 12 is 121, i.e. points to the deadband, as discussed above. Finally, FINEDELAY is incremented by 1, to compensate for the single-address overshoot caused by subtracting 45 (rather than 44.67) from the value of DELAY. Thus, in one pass through the INSTARANGE routine of FIG. 21, a calibrated value of DELAY is returned.

It will be appreciated that, if a deadband address other than 121 is desired, a value other than 45 will be subtracted from the value of DELAY. For instance, if 135 were the address of the center of the deadband, then DELAY would be adjusted in box 17 of FIG. 21 by subtracting $(255-135)/3=40$, rather than 45; and in this case, no adjustment to the value of FINEDELAY would be necessary, since 120 is evenly divisible by 3. Additionally, if an incrementing counter were used for TEMPRY instead of a decrementing counter, then the inversion step of box 17 in FIG. 21 (i.e., subtracting TEMPRY from the maximum value of DELAY) could be eliminated.

As a practical matter, the step of box 17 in FIG. 21 of subtracting both TEMPRY and 45 from the maximum value of DELAY may be carried out in two steps, such as by first adding the value of TEMPRY to 45 and then subtracting the sum from the maximum value of DELAY.

Once the value of DELAY is adjusted in the INSTARANGE routine as described above, the remaining steps and routines in the main program of FIGS. 7A-7D may then be utilized.

Figure 23:
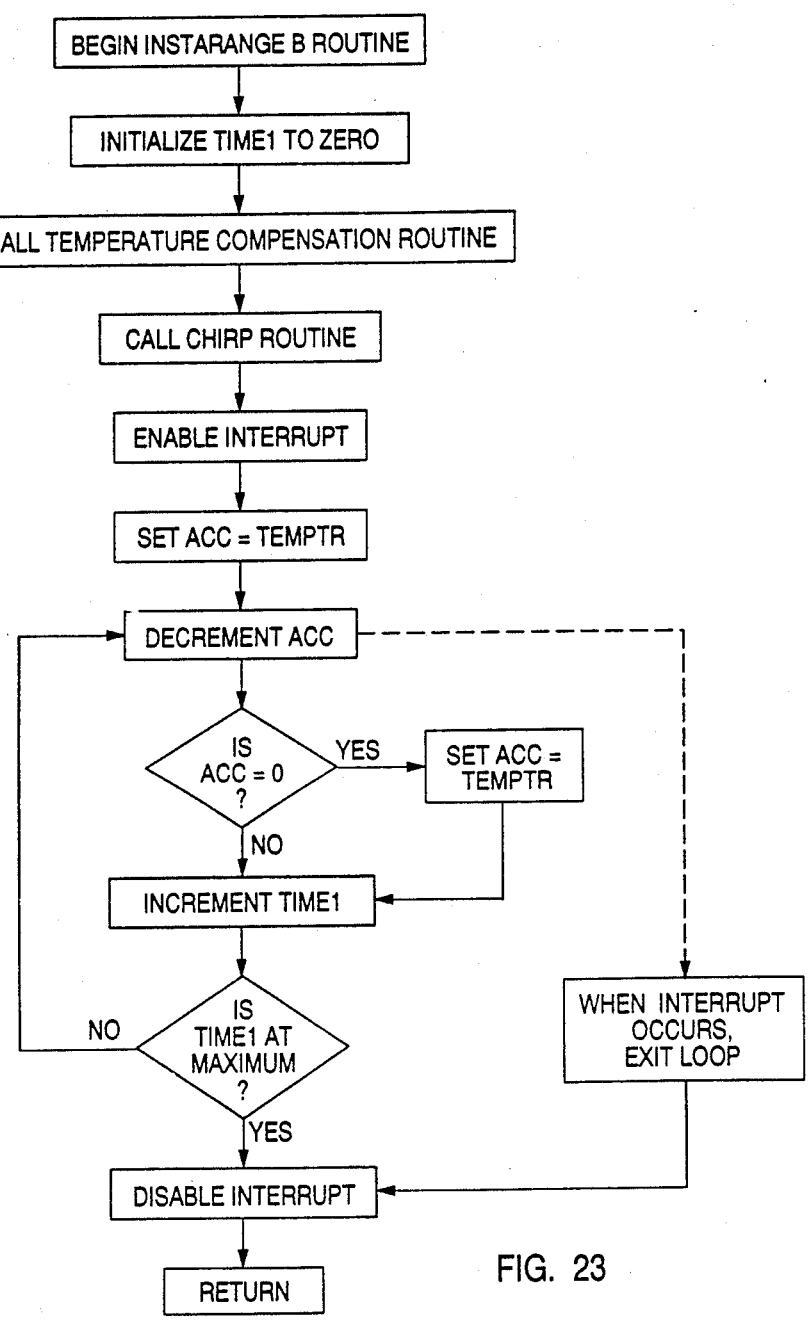
FIG. 23 is a flow chart of an alternative autoranging procedure called INSTARANGE B.
Figure 24:
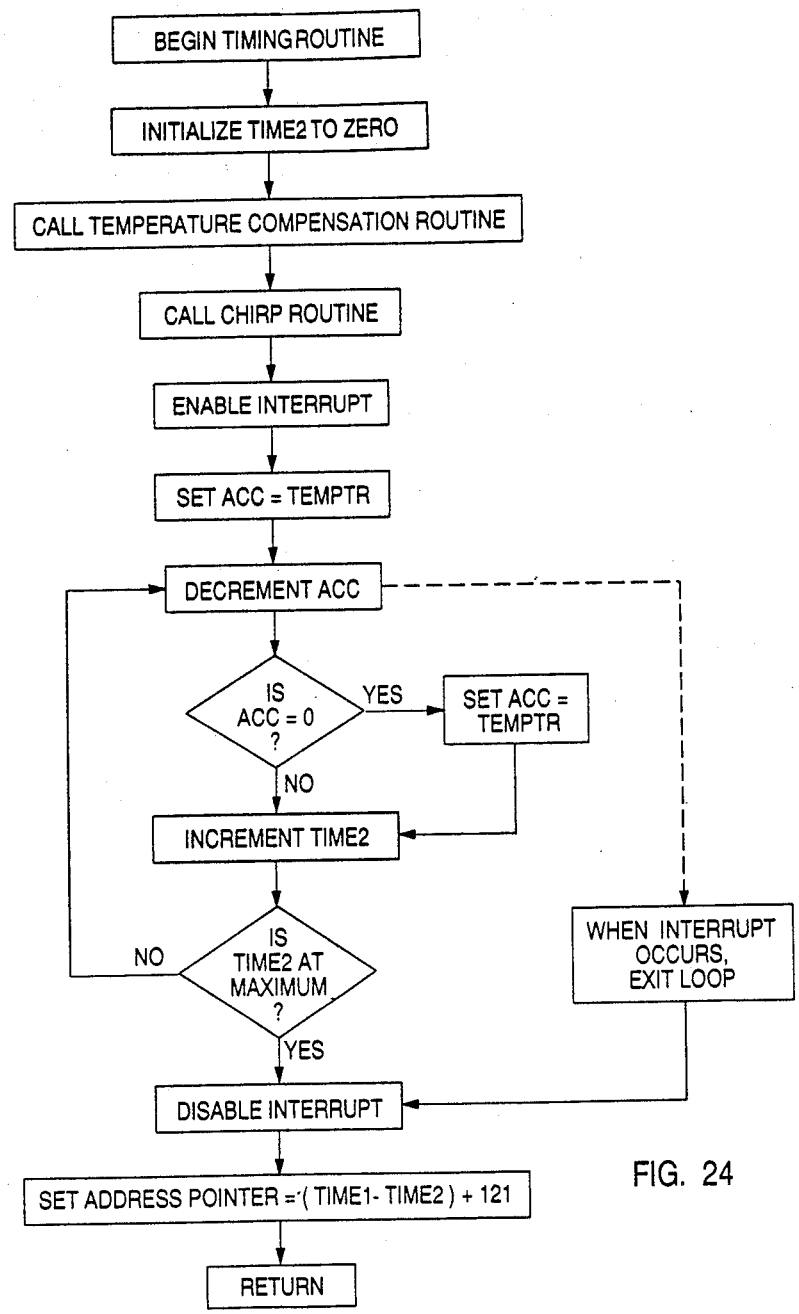
FIG. 24 is an alternative routine called TIMING.

In another alternative embodiment, the program of FIGS. 7A-7D is replaced by Program B of 22A-22B, which calls the INSTARANGE B and TIMING routines of FIGS. 23 and 24, respectively, as discussed below. Program B (the details of which are given below) generates a first time interval for calibrating purposes, and then for grading generates a second time interval corresponding exactly to the amount of time taken for the echoed chirp to reflect back to the follower, and this second time interval is compared directly to the first time interval to generate the blade and frame adjustment values.

Figure 22A:
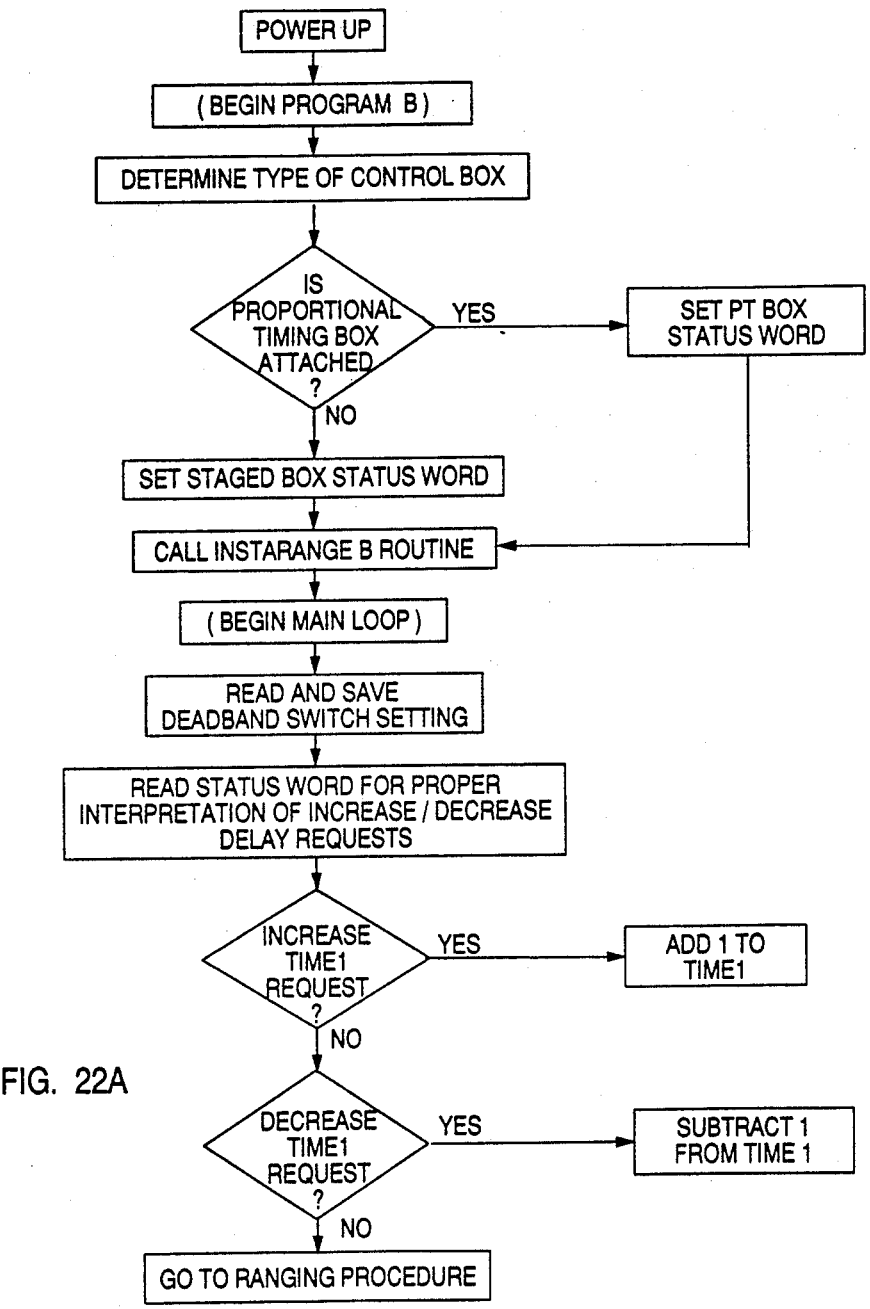
FIGS. 22A and 22B comprise a flow chart depicting an alternative embodiment entitled PROGRAM B.

As shown in FIG. 22A, the initial steps of testing for staged or proportional timing control boxes are the same as in the main program of FIG. 7A. Although the paver box test has not been shown in FIG. 22A, this could also be implemented, as could an alternative paver box program incorporating the features of the alternative embodiment of FIGS. 22-24.

Then, the INSTARANGE B subroutine is called. This routine, which appears in FIG. 23, first initializes a variable TIME 1 to 0, and then calls the TEMPERATURE COMPENSATION routine and the CHIRP routine of FIGS. 9 and 10, respectively. The interrupt is then enabled, and the loop shown in FIG. 23 increments TIME1 while adjusting the amount of time consumed by the loop based upon the value of TEMPTR returned by the TEMPERATURE COMPENSATION routine When an interrupt occurs, the loop is exited, the interrupt is disabled, and a return to the main program is implemented. When the INSTARANGE B routine is exited, therefore, the value of TIME1 represents the total travel time for the chirp to travel from the follower to the reference surface and back, as adjusted for temperature.

In the lower half of FIG. 22A, steps are implemented which are similar to those implemented in the lower half of FIG. 7A. When an increase TIME1 or decrease TIME1 request is made by the operator (or by some other means, such as a peripheral), 1 is added or subtracted, respectively, to the variable TIME1. It will be understood that tests for whether TIME1 has exceeded its limits due to such increase or decrease request may also be utilized, as in the flow charts of FIGS. 7C and 7D.

Figure 22B:
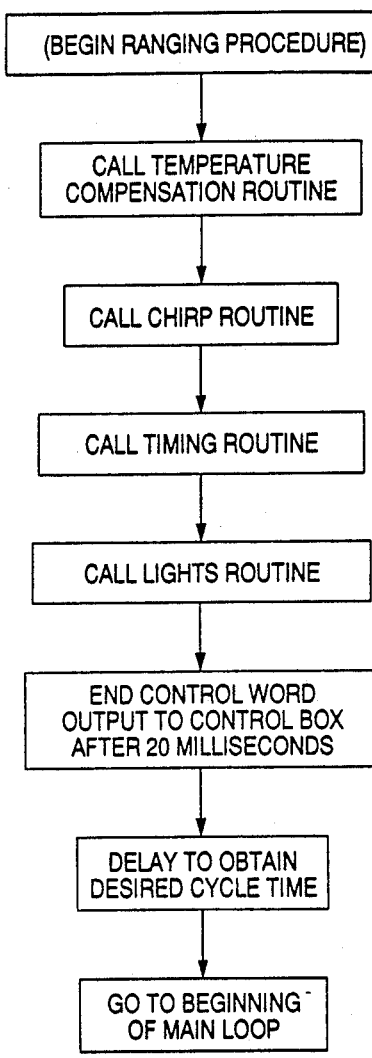

At the end of the flow chart of FIG. 22A, the program goes to the ranging procedure shown in the flow chart of FIG. 22B. This is analogous to the ranging procedure of the main program shown at FIG. 7B. First, the TEMPERATURE COMPENSATION and CHIRP routines are called, as in the main program. Then, the TIMING routine of FIG. 24 is called. This routine is quite similar to the INSTARANGE B routine, except that a value for the variable TIME2 is returned, representing the actual distance from the follower to the reference surface as the grader travels along. At the end of the TIMING routine of FIG. 24, the address pointer is set equal to (TIME1 minus TIME2) plus 121. If TIME1 is equal to TIME2, then the resulting value for the address pointer is 121, which points to the center of the green band. If TIME1 and TIME2 are different, this step in FIG. 24 generates a value for the address pointer which is different from 121 by an amount representing the difference in the calibrated reference surface level and the actual reference surface level measured as the grader moves along. Finally, a return is implemented in FIG. 24.

Returning then to FIG. 22B, the LIGHTS routine of FIG. 13 is called as usual, and the address pointer is utilized to address the appropriate control word in the control table, adjustments are made to the hydraulics as necessary, and a return is implemented to the ranging procedure of FIG. 22B. Finally, in the flow chart of FIG. 22B, the output to the control box is ended after 20 milliseconds and a DELAY is implemented to obtain the desired cycle time, as in the flow chart in FIG. 7B.

Thus, with the alternative embodiment of FIGS. 22A-22B and 23-24, the present invention accomplishes the advantages discussed above.

Again, the effect is to compare the value of the second time interval with that of the first time interval, in a direct manner (instead of the indirect manner of the embodiments utilizing the DELAY variable), and then to adjust the height of the blade and frame on the basis of that comparison. Other variations on the above embodiments may also accomplish these tasks.

The entire main loop (of any of the embodiments) is preferably implemented at a rate of ten times per second, thus obtaining a very fast update on changes in the level of the reference surface 170. For this purpose, at the end of the main loop in FIG. 7B, the step of delaying to obtain the desired cycle time is implemented. The step just preceding the cycle time delay involves ceasing the control word output to the control box after a given period of time, such as 20 milliseconds. The purpose of this step is to emulate certain standard detectors which are configured to respond to sweeping laser signals of approximately 20 milliseconds' duration. Other detectors may be emulated by utilizing different periods by the control word and different cycle times for the main loop.

Referring to FIGS. 7C and 7D and FIGS. 17C and 17D, if, as the operator grades the surface 160, he wishes to alter the offset from the surface 170, an "increase delay" or "decrease delay" request may be made. Thus, the control box is provided with a switch or a dial (not separately shown) and a display. If the operator began with an offset of, for example, 12 inches, he may dial in a request to decrease the offset by 2 inches to 10 inches. This request will be sent to the microprocessor via pins G and H of FIG. 6, which are connected as inputs at pins MP1 and MP39. If the operator desires that the blade 40 be raised, this corresponds to a decreased offset, and requires that the frame 20 be raised relative to the surface 170. Since the follower 10 would then be farther away from the surface 170, the total amount of time required for the chirp to echo back to the follower 10 is increased, and thus a decreased offset request corresponds to "increase delay" request. Similarly, if the operator wishes to increase the offset, i.e. lower the surface 160 relative to the surface 170, then the net result is that the follower 10 must be closer to the surface 170, and a "decrease delay" request must be implemented. In a preferred embodiment, the INCREASE DELAY or DECREASE DELAY request is repeatedly implemented so long as the switch is held up or down, respectively.

Figure 7C:
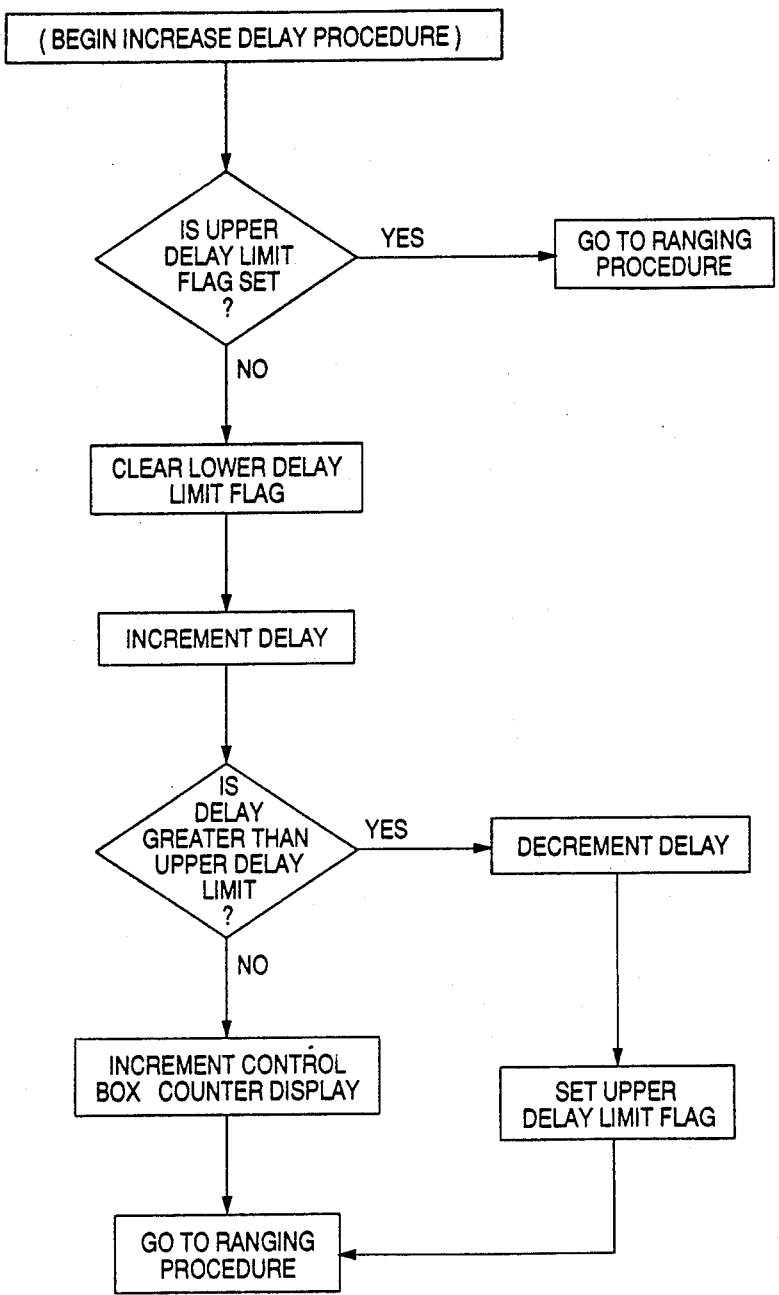

If an increase delay request is made, the INCREASE DELAY procedure of FIG. 7C is begun. The procedure first tests for whether an upper delay limit flag is set, which would indicated that the delay is already at its maximum. This flag is preferably initialized at some point before the INCREASE DELAY procedure is first requested (but not separately shown in the flow chart). If the upper limit flag is already set, the delay is already at its maximum, and the blade cannot be raised any higher. Therefore, the program then branches to the beginning of the ranging procedure of FIG. 7B, in effect overriding the operator's request to raise the blade 40.

If the upper delay limit flag is not set, then the INCREASE DELAY procedure clears a lower delay limit flag (which may have been set during a previous DECREASE DELAY request). Then, the value of the variable DELAY is incremented, and is tested to see whether it exceeds the upper delay limit. If it does, the variable DELAY is then decremented, the upper delay limit flag is set, and the program branches to the beginning of the ranging procedure, once again overriding the operator's request to raise the blade 40. If the upper delay limit is not reached, the requested increment in the DELAY variable is accomplished, and the microprocessor 100 sends output signals at pins MP31 and MP 32 to the quadrature lines connected through pins I and J to the control box, thereby altering the counter display on the control box to indicate to the operator of the qrader that the increase delay request is being implemented.

The net result of the INCREASE DELAY procedure is to increment the DELAY by a single minimum step. Then, the ranging procedure is executed, and the blade is thereby raised by this single minimum increment.

Each increment or decrement is reflected on the numeric display of the control box 80 (being supplied thereto via pins I and J), so that the operator may keep follow of the amount by which the blade depth is changed.

In the preferred embodiment, each increment in the variable DELAY corresponds to approximately the time the chirp takes to travel 1/200 of a foot. Since the chirp must make a round trip from the follower to the surface 170 and back, this effectively corresponds to a height difference for the blade 40 of 1/100 of a foot. Thus, for a given single incrementation of DELAY, the blade will rise 1/100 of a foot, and will lower by the same amount for a single decrementation of DELAY. Other degrees of fine adjustments of the blade 40 may be implemented, and, indeed, are implemented when the AUTORANGE and INSTARANGE routines are called.

Figure 7D:
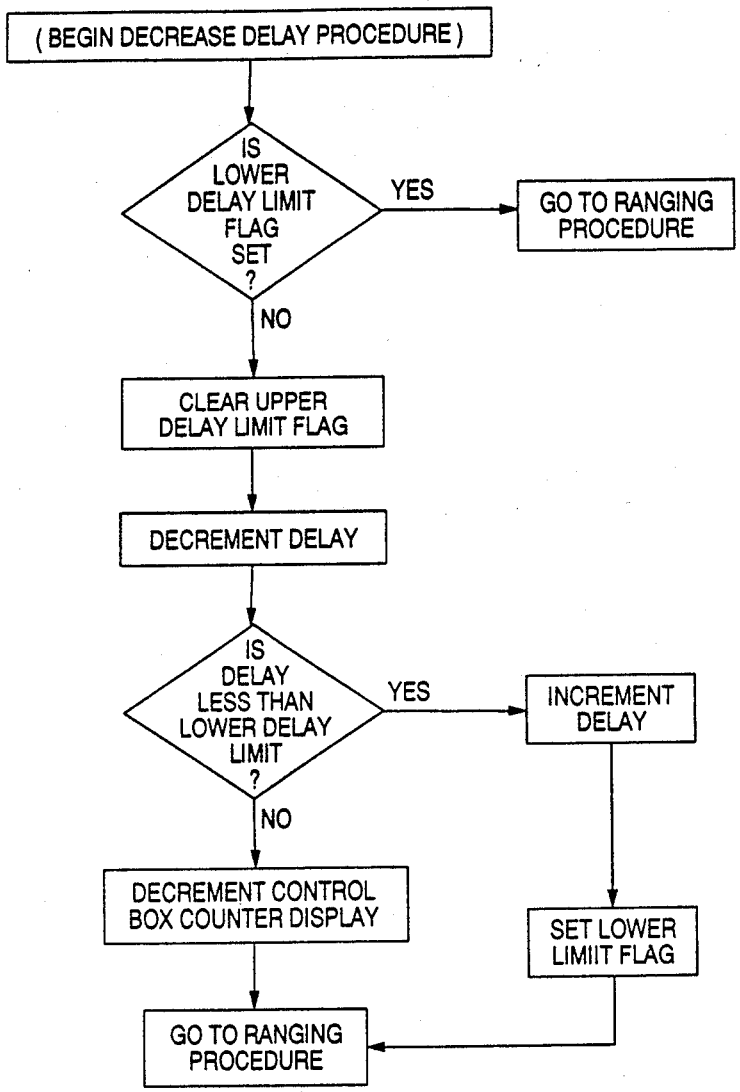

The DECREASE DELAY procedure is simply the opposite of the INCREASE DELAY procedure and, as shown in the flow chart of FIG. 7D, will decrement the value of DELAY once for each loop of the main loop. Since the main loop is executed 10 times per second and an increase or decrease of 1/100 of a foot may be accomplished for each loop, it will be seen that, in this embodiment, the program accommodates grading alterations requested by the operator at a rate of approximately 10/100 (or 1/10) of a foot per second.

The increase and decrease delay requests are accomplished somewhat differently for the staged control box than for the PT control box. This is because the staged box utilizes a refinement of hydraulic valve adjustment known as dynamic braking. This standard procedure of staged control boxes is thus preferably compensated when the staged control box is utilized, by simply adding a delay after the implementation of each of the INCREASE DELAY and DECREASE DELAY procedures for the staged box, in order to prevent erroneous signals from the control box to the follower, which might otherwise occur at the time of releasing the switch for making the increase delay or decrease delay request. (The compensation is not shown separately in the flow charts of FIG. 7C and 7D.)

For some ranges of sensitivity for the follower 10, it may be necessary to utilize two variables, taken in the aggregate as a single number, to accommodate the desired range of operation of the device. Thus, DELAY may actually refer to two 8-bit registers, which in the aggregate represent the total amount of DELAY, with the result being that a greater delay time and hence a smaller offset may be accommodated. Thus, one such variable might be DELAY1, and the other DELAY2. When the value of DELAY1 reaches its maximum (which is 255 for an 8-bit variable), DELAY2 is incremented by 1 (such as from 00000001 to 00000010), and DELAY1 is reset to its minimum value for incrementation again. This effectively creates a two-byte value—of base 256, since each incrementation of DELAY2 is the equivalent of 256 incrementations of DELAY1—for DELAY out of the two variables DELAY1 and DELAY2. It is a straightforward matter, given the above method of utilizing two variables as one, to alter the loops of AUTODELAY and MAINDELAY to accommodate a dual-register variable as opposed to a single-variable register, by ensuring that the "upper" register (corresponding to DELAY2) is incremented or decremented only when the "lower" register (corresponding to DELAY1) has reached its upper or lower limit, respectively. Indeed, in the preferred embodiment, this is done, in order to allow for a greater follower sensitivity range than would be possible with a single variable DELAY.

Figure 17A:
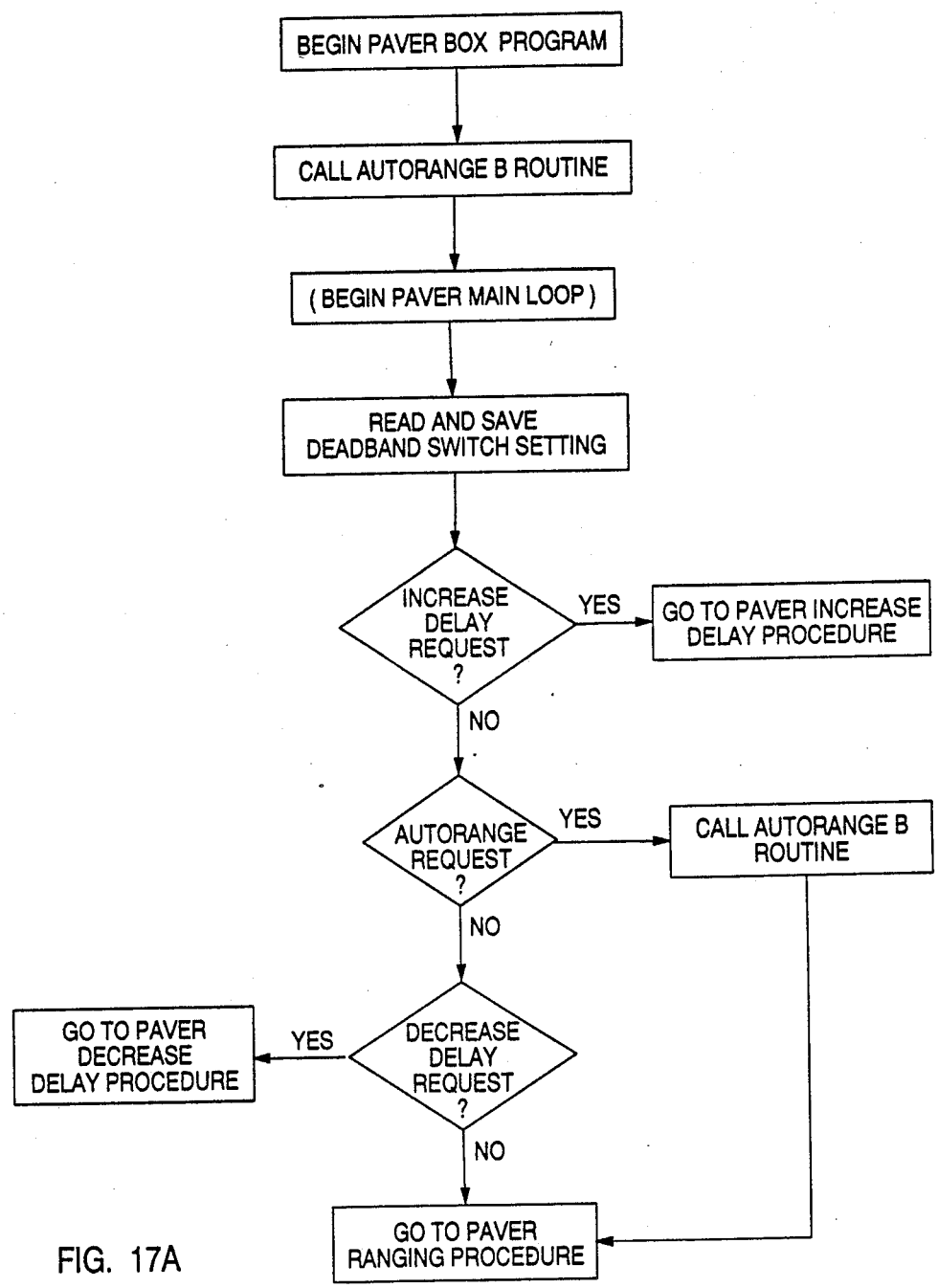
FIGS. 17A–17D, comprise a flow chart of the paver program, of the invention, wherein FIGS. 17A and 17B together comprise the paver program.

If the control box which is coupled to the follower 10 is a paver box, then at the top of the flow chart of FIG. 7A, the main program will branch to the paver box program of FIG. 17A. Such an implementation is shown in FIG. 5, wherein the follower 10 and paver control box 85 are mounted on the paver 180. The paver includes a paver blade (usually referred to as a "screed") 280, which pushes before it, as the operator of the paver drives along, a quantity of paving material 290, which may be sand, asphalt or the like. The paving material 290 is leveled by the blade 280 into the desired surface configuration. The basic operation of the paver 180 is analogous to that of the grader 30, in that the blade 280 is raised and lowered to compensate for the level of the reference surface 170. The arrangement of the blade 280 of the paver 180 is, of course, somewhat different than that of the blade 40 of the grader 30. Thus, the blade is connected at the forward end of the paver 180 to the rams 50 and 60 via draw bars 285, one of which appears in FIG. 5 and the other of which would be located symmetrically opposite the draw bar 285 on the other side of the paver. As the forward ends of the draw bars 285 are raised, the change in the height of the leading edge (which would be beneath the paver 180) of the blade 280 causes the blade level to travel upwards, due in part to a change in the angle of attack of the blade 280 relative to the paving material 290. Conversely, as the draw bars are lowered, the leading edge of the blade 280 lowers, and digs into the paving material 290 somewhat, resulting in a lower pavement surface. Thus, although the physical configurations of the grader blade 40 and the paver blade 280 are not identical, the functions of these blades are analogous.

In operation, it may be desired that a surface 300 be provided with asphalt pavement so that its height matches that of the reference surface 170, in which case the operator of the paver 180 will first adjust the height of the blade 280 such that, as the paving material 290 is pushed along, the resulting paved height of the surface 300 is at the same level as the reference surface 170. Once the blade 280 is adjusted to the appropriate height, the operator is ready to "autorange" the program. This may be done at power up, as with the staged box and proportional timing box; but also, an additional button or switch may be provided on the paver control box 85 to autorange at any time, in alternative embodiments. Thus, in the paver box program depicted in part in the flow chart of FIG. 17A, a test is implemented for whether or not an autorange request has been made by the operator. If so, the AUTORANGE B program (see FIG. 18) relating to the paver box program is called. In the preferred embodiment, the same pins G and H which are utilized for increase and decrease delay requests are also used to call the AUTORANGE B routine, since a two-bit signal can accommodate three different requests.

There are two major differences between the paver box program of FIG. 17 and the staged box and PT box program of FIG. 7. The first is that in the paver box program, allowance is made for finer adjustments in the height of the blade 280 than is the case for the staged box or PT box implementations. This is accomplished in a routine called FINEDELAY, shown in FIG. 19 and discussed below. The other difference lies in the adjustments made to the blade 280 via the rams 50 and 60. In short, the coarse and fine adjustments represent an averaged adjustment over 10-loop intervals for the paver program, whereas for the staged and PT control boxes, each adjustment represents the result of a single pass through the main loop.

Referring now to FIGS. 17A–17D, the paver box program is in other respects essentially identical to the main program of FIGS. 7A–7D.

Figure 18:
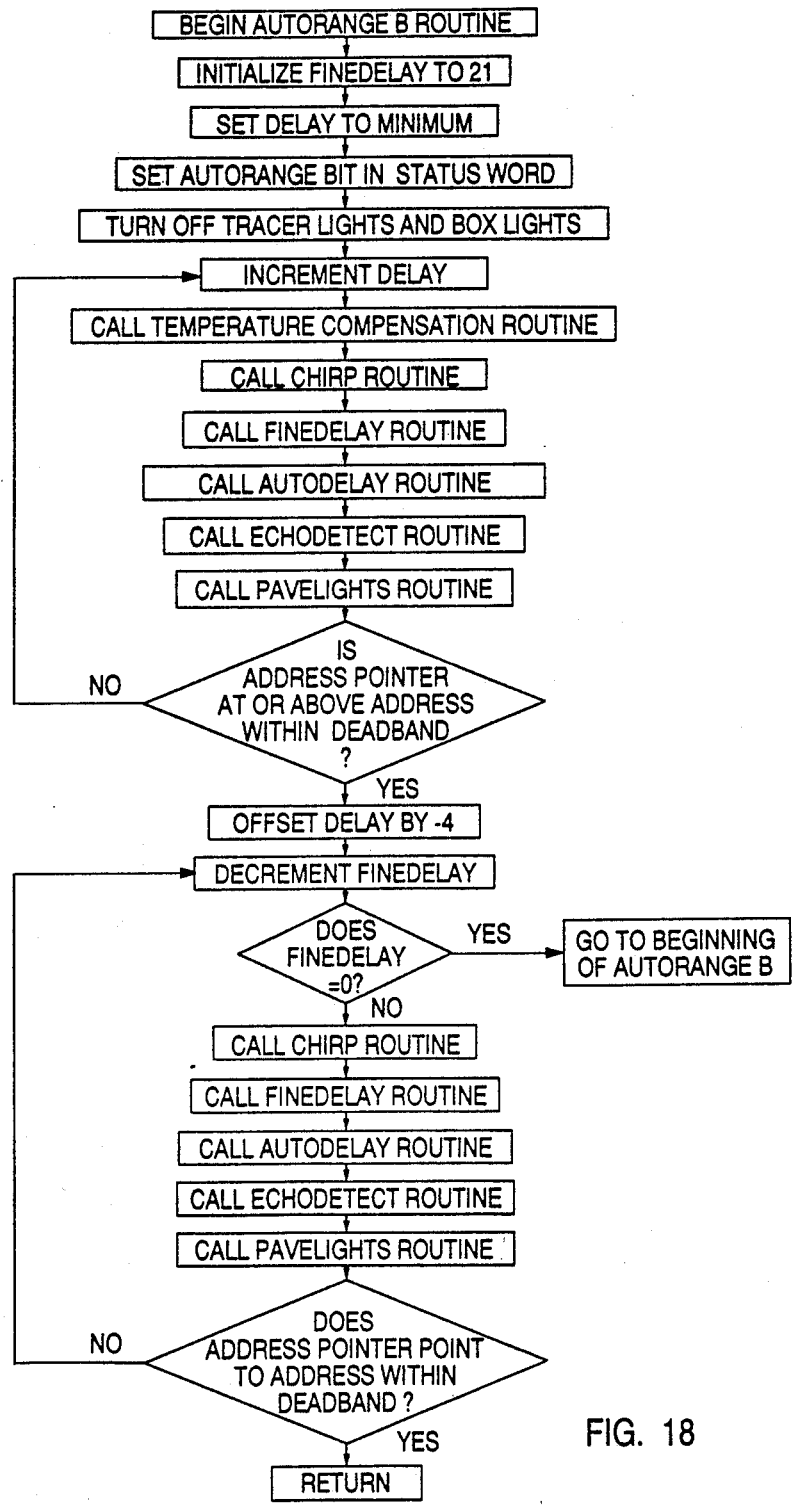
FIG. 18 is a flow chart of the AUTORANGE B routine which is call by the program of FIG. 17.

At the beginning of the paver box program in FIG. 17A, the AUTORANGE B routine is called, as depicted in the flow chart of FIG. 18. At the beginning of this AUTORANGE B routine, the program sets a variable—to be referred to as FINEDELAY—to some predetermined value, which in the preferred embodiment is the value 21. In the loop of the AUTORANGE B routine, the variable DELAY is set (in what might be referred to as a "coarse tuning" manner) so as to effectively calibrate the program for the height of the follower 10 above the reference surface 170. However, this routine also sets the value of FINEDELAY for fine tuning such that the combined delay implemented by the FINEDELAY and MAINDELAY routines ensures that, when the ECHODETECT routine is called, the value of the address pointer will be within the deadband range.

In order to accomplish this, during the first loop shown in the AUTORANGE B routine, the routine FINEDELAY is called after the first calling of the CHIRP routine. The FINEDELAY routine, which is depicted in the flow chart of FIG. 19, simply implements a delay relating to the amount of time necessary to decrement FINEDELAY to zero, utilizing the variable TEMPRY. Of course, this amount of time depends upon the value of FINEDELAY, which, as noted above, was initialized to 21. For reasons to be described below, the rate of decrementation in the FINEDELAY routine is faster than in the MAINDELAY routine, by a factor of three in the preferred embodiment.

Thus, in the upper loop of the AUTORANGE B routine of FIG. 18, FINEDELAY is a constant, and a calibrated value of DELAY is returned, just as in the AUTORANGE A routine. (A calibrated value for delay may be defined as the initial value of DELAY which, when continuously decremented to zero followed by continuous incrementation of the accumulator during the interval preceding the echo return interrupt, results in an accumulator value at the time of echo return interrupt which is in the deadband.) However, a second loop is also implemented in AUTORANGE B. First, however, the value of DELAY is offset by −4; as will be seen below, this is an adjustment to accommodate the fact that an average value of adjustments is being utilized instead of instantaneous values.

It will be noted that, at the end of the first loop in AUTORANGE B, the test is not whether the address pointer points to an address within the deadband, but whether the address pointer points to an address at or above the deadband. The reason for this, and the reason for utilizing the FINEDELAY variable and routine, is that in paving operations a much tighter deadband is typically utilized for tighter height control of the paving operation. Indeed, for many applications, a deadband of a single address of the control table is used (such that only address 121 includes a "green" control word). At the normal rate of decrementing the DELAY variable, it is easy to overshoot this address. For instance, in the preferred embodiment utilizing a staged or PT control box, the accumulator runs at a decrementation rate during the ECHODETECT routine which is three times as fast as the rate of decrementation during the MAINDELAY routine. The result of this is that if DELAY is incremented by 1, the value for the address pointer after the ECHODETECT routine is implemented during the ranging procedure will be 3 higher than for the previous value of DELAY. For instance, if a given value of DELAY led to a value of the address pointer of 119, and the AUTORANGE routine then increments DELAY by 1 (since a "green" control word has not been found by the address pointer), the next value obtained for the address pointer will be 122, and the program will therefore have skipped the single-address deadband at address 121. Thus, in the paver box program, if this happens, the variable FINEDELAY is decremented once and, if it has not hit zero, the routines CHIRP, FINEDELAY, AUTODELAY, ECHODETECT, and LIGHTS are called, and the pointer address is then tested to see whether it points to the "green" control word, i.e., lies within the deadband. If it does not, the lower loop of FIG. 18 is repeatedly implemented, with repeatedly decremented values of FINEDELAY, until the correct value of FINEDELAY is determined such that the address pointer ends up within the deadband. It will be appreciated that this point was reached by incrementing the variable DELAY slightly too much, such that the accumulator during the ECHODETECT routine decremented past the deadband address of 121. Thus, by decrementing FINEDELAY, the program in effect backs up the DELAY to allow the deadband to be reached during the ECHODETECT routine.

Figure 17B:
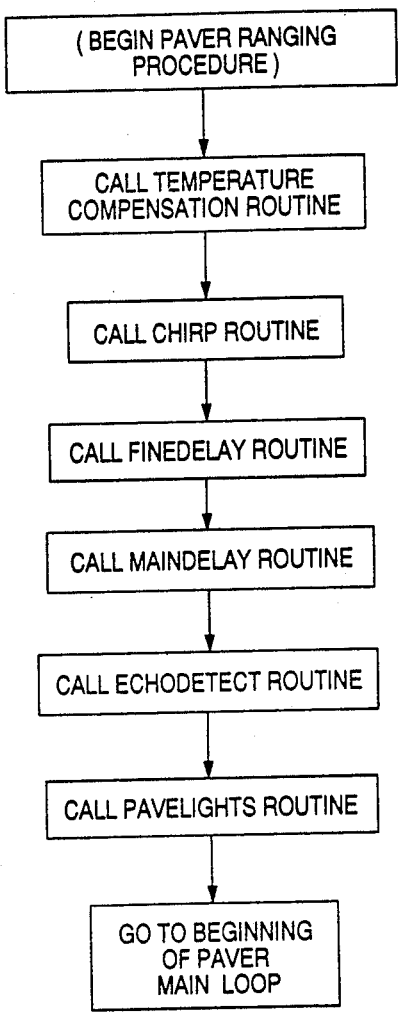
Figure 17C:
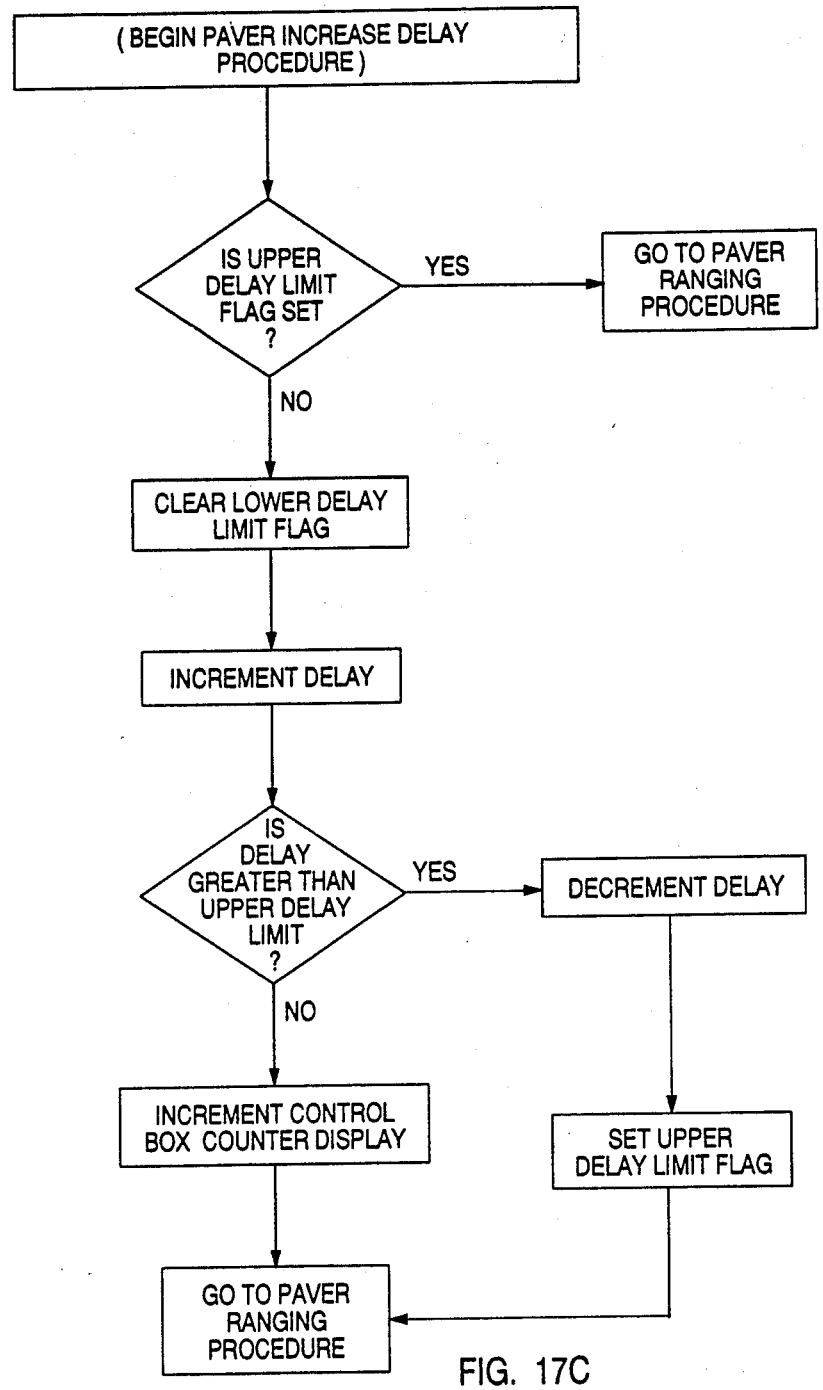
Figure 17D:
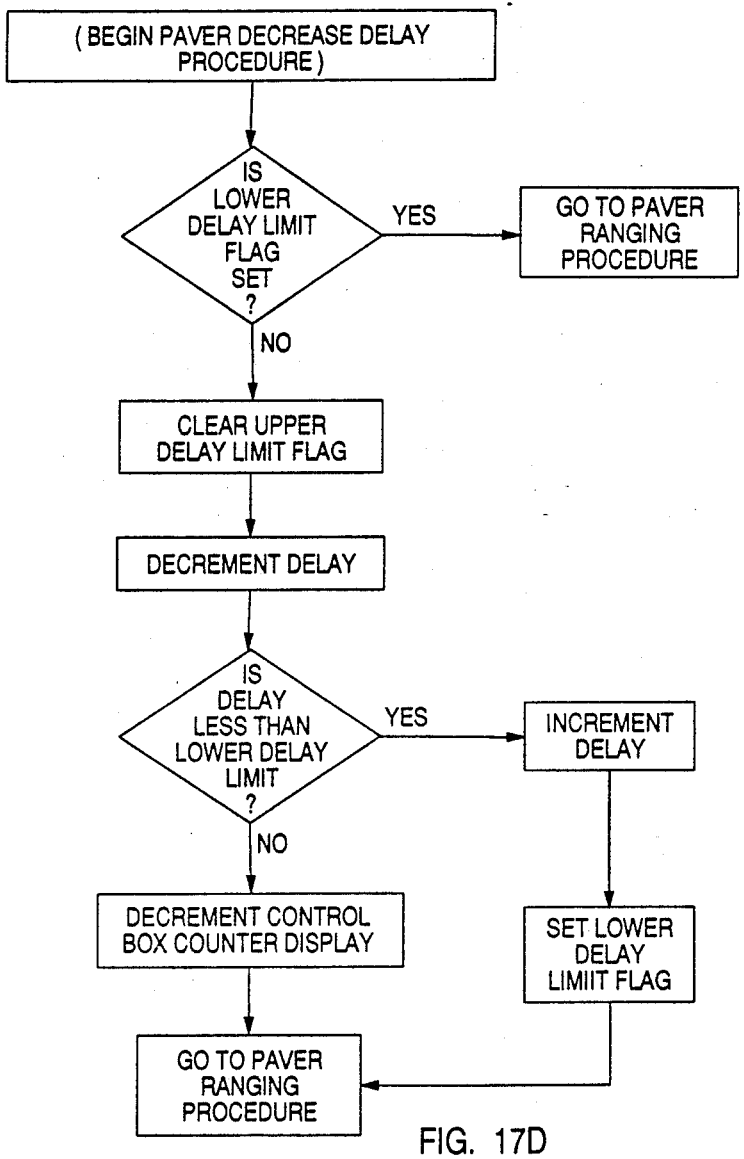

Once the calibrated values of DELAY and FINEDELAY are determined, the ranging procedure for the paver is carried out, as indicated in the flow chart of FIG. 17B. Again, the FINEDELAY routine is called, and then the MAINDELAY and ECHODETECT routines are called.

Figure 20:
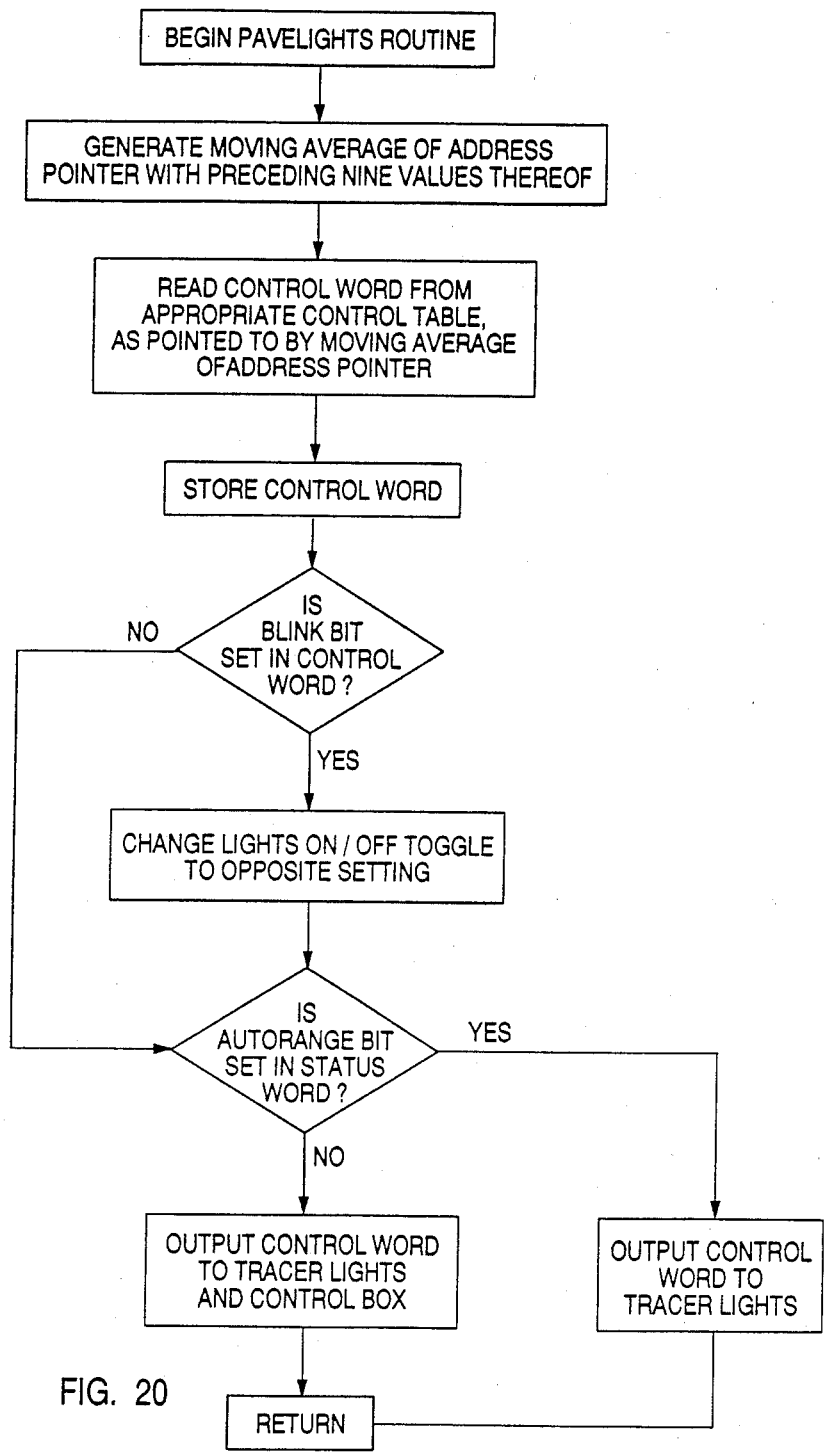
FIG. 20 is a flow chart of the PAVELIGHTS routine called by the program of FIG. 17.

At this point, in the preferred embodiment the pointer address value determined during the ECHODETECT routine is averaged (by standard moving average procedure) with the previous nine pointer address values. Thus, nine temporary pointer address registers are provided, whereby the most recent nine values of the pointer address are stored. Then, the PAVELIGHTS routine depicted in the flow chart of FIG. 20 is called. Other than the averaging procedure, this routine is identical to the LIGHTS routine. The averaging procedure utilized by the PAVELIGHTS routine for the paver implementation is an option which results in smoother transitions from one grading level of the blade 280 shown in FIG. 5 to another. As the paver 180 moves along, the height of the blade 280 determines the amount of paving material 290 is distributed over the surface 300, and hence determines the height of the resulting pavement. Thus, the paving operation is analogous to the grading operation. It will be appreciated that the paver 180 will function acceptably without utilizing an averaging procedure as in FIG. 20, and indeed for some applications it will be preferred to omit the averaging, instead using the more direct-response method of the LIGHTS routine.

When the PAVELIGHTS routine is executed during the first nine passes through the AUTORANGE B routine upper loop (as DELAY is being incremented for calibration purposes), there will, of course, not be as many as nine preceding values for the value of the pointer address. Instead, there will typically be random values appearing in the nine temporary pointer address registers, and it is therefore preferable to initialize these registers to a maximum (or some other known value), in order to avoid prematurely exiting the upper loop of FIG. 18 due to an erroneous value of the moving average of the address pointer based upon such random values.

The reason for the −4 offset of the pointer address during the AUTORANGE B routine is as follows. Since (as mentioned above ) a single incrementation of the variable DELAY will result in a difference in the address pointer after the ECHODETECT routine of 3, as AUTORANGE B is executed, each value of the address pointer which is produced will be three less than the previous value of the address pointer. Since the PAVELIGHTS routine tests for whether the average value (rather than the instantaneous value) of the pointer address lies within the deadband, there will be several values of the pointer address below the deadband and several values above it. Thus, at least these final four values for the address pointer will lie above the deadband, and for that reason the value of DELAY is adjusted downward by 4 to offset this effective overshoot due to averaging.

As shown in the flow chart of FIG. 17A, the paver box program calls the paver increase and decrease delay procedures at the request of the operator. These procedures, depicted in the flow charts of FIGS. 17C and 17D, respectively, are substantively identical to the increase and decrease delay procedures shown in the flow charts of FIGS. 7B and 7D.

Although the paver box 85 as depicted in FIG. 5 has a display 95, typical paver boxes do not include such displays. For such paver boxes, it may be difficult for the operator to determine by how much he has altered the height of the blade 280 by making INCREASE or DECREASE DELAY requests (which are made by means of a switch 105). For such a system it is desirable that the switch 105 is a toggle configured such that when it is depressed, a single INCREASE or DECREASE DELAY request is implemented, with the direction that it is depressed determining whether the request is an INCREASE DELAY request or a DECREASE DELAY request. Thus, for example, if the operator wishes to raise the blade 280 by 7/100 of a foot, he would depress the toggle in the appropriate direction seven times.

As shown in the flow chart of FIG. 17A, after the paver box program tests for whether an increase delay request has been made, it then tests for whether an autorange request has been made, and finally tests for whether a decrease delay request has been made. In an alternative embodiment, the test for whether an autorange request has been made may be included as one of the steps of the decrease delay procedure.

Appendix A is the software in hexadecimal format object code of the best mode of implementing the invention using the apparatus of FIG. 6 and one of the known family of control boxes available from Spectra Physics.

Using the foregoing apparatus and method, it is a simple matter for an operator of an earth grader or paver to align the blade of his machine at a particular desired height, autorange the follower by powering up, and then drive the grader away, assured that the follower will maintain the blade at the chosen depth throughout the grading process. The follower will, furthermore, provide error signals to the operator to warn him that the sensitivity range of the instrument is being exceeded (as specified above), and will automatically adjust for temperature for the entire time the grading is being carried out. By implementation of the variations discussed above, by utilization of different constants, routine implementation times and control table values, and by making other alterations to the above disclosure based upon the teachings herein, it will be appreciated that modifications and variations may be made on the present invention without departing from the spirit and scope of the claims appended hereto.

APPENDIX A

```
:10000000407001574969BA00B927B1FF23FF398E
:100100023FF3AB320B000D5B9FF2301B826A0C508
:10020000A5B301BC0134A254073660000064ABDC
:100300034F709000000000000000000000008C
:1004000000000000000465742E14BC14CD34057447
:100500001054A39A8FC5B8FFB967E35AE95A043028
:10060000462EF5042EB820F0C68A56703670447B
:10070008222301371760C68A0447B82123013705
:100800017600C68A044724DF24EBB820B000B821EB
:100900080008228000369656980447243399EF62
:1000A00034D599CF34D6B91034D68930B399DF3449
:1000B000D699CF34D68920B4D68930B3B0F99F7B2
:1000C000000000008908000000E3BE33B927F1A5
:1000D000A8B902E3D3E9D3B3FBA8FCA9D5F9C5B662
:1000E000ED86ED86ED07C6F7E8DFE9DF83B8FFB9F7
:1000F0005E8F1E9F18300D5F9BD01EDFBC504E850
:1010000023FF3A0455FBA8FCA9D5F9C5861A861A1F
:101100086A07C61DE80CE90C93C52400D5F9BD75
:1012000001ED21C5241524D08AFF04301C244E047F
:101300007645FD5BA01C5B82723FFA027BB01BC60
:101400001D5FFAE2330AFC5F0A01BFBC67AFC0380
:10150000FEF67EBF00742E14BC14CD14D87410B8F3
:10160000FFB9120000EB65FF0378C6C0E965FF0328
:1017000079C6C0FF037AC6C02448242C0430FB0390
:101800006EF62F2453C6ABB827F007A03496049C14
:1019000000000000000742E14BC14CD14D874109C
:1001A0006A0FB8FFB975E8A6E9A683C8C374FEB871
:1001B00027F00707A0D5BC04C53496FA0357C6C07C
:1001C000D5BAFFFEAFB80FC5247CD5BA01C564FE0E
:1001D0008AFF0430044788FFB938E8DAE9DA83B651
:1001E000D414ADB8FFE8E574BD04477604149EB3F6
:1001F000FFE8F154FF04476900D5FF53CFAF09771B
```

```
:100200007753306FAFC583260ED527AFC583D5FF93
:100210000274340AFC583B83C27A0FF8230A0B83112
:10022000060E625545FB83260E62C545FB83360E670
:1002300033545FB83460E63A545FB83560E64154F1
:100240005FB83660E642545FB83760E64F545FB831
:100250003B60E656545FB83960E667545F4467A972
:1002600CB83CF017A0F9832AB83CF0A9B83D230A9E
:100270000A0FA29BA08376037F67DA7449660972917
:10028000F729F7E68A376037449E376037E6C96066
:10029000449319EACB9729AFE909B838F018A0C828
:1002A000C8E9C7D5FF5340C6AECEFF0300AFD5FFB1
:1002B0005320C6BDFF5310C6C1D40044CDF4004442
:1002C000CDB40044CD44EB449C4492447ED5FAC561
:1002D0005301C6D6BAAFFA5390C6EBB826F0C6E7CC
:1002E00027A0FA43F044EDD52301A0C5FA43B03A94
:1002F000B8FFB91CE8F4E9F4836417000000008536
:100300001BFB960F23FD6CF60DBB011C83C9B58345
:10031000BF00BA2F23F00507000096171EFF030F43
:10032000AFB304ED9AFF8AFF2301BF7064179A7FA1
:100330008A80D5B9FFC9095301C640F9C648643B5A
:1003400023DB371769A9C583B916C583272BFF3A6D
:10035000BF00D5BA00C5FC03FDF65D04302433B8F8
:100360001A1BFBC68BE861FC03FEF689BF00742EE6
:1003700014BC14CD14D87410B8FFB918E37CE97C08
:10038000FF03FCF687645F2448247E242CA5EB95B8
:10039000EC951B1C9583AFD5FAC5C6A1F8ABF9AC9B
:1003A000FF83D5F9BD01EDA6C564DFBB05742E142E
:1003B000EC34D634D6E3ADB82723FFA0BB01BC01BB
:1003C000D5BA03C534D634D6742E14BC14CDB8FFB8
:1003D000B903D5F9C505000000000007C6A2E872
:1003E000D6E9D6FC03FCAC23006C3717AC23006BBA
:1003F0003717A5B831E8F8CC8F5D5BA00C5BE0A73
:1004000034D634D6742E14BC14CD34057410FF03C6
:1004100079F61D34D634D6D5BA00C504308927F0E5
:10042000007A0EE00D5BA00C50430FFFFFFFFFFFB8
:10043000FFFFFFFFFFFFFFFFFFFFFFFFFFFFFFFFCC
:10044000FFFFFFFFFFFFFFFFFFFFFFFFFFFFFFFFBC
:10045000FFFFFFFFFFFFFFFFFFFFFFFFFFFFFFFFAC
:10046000FFFFFFFFFFFFFFFFFFFFFFFFFFFFFFFF9C
:10047000FFFFFFFFFFFFFFFFFFFFFFFFFFFFFFFF8C
:10048000FFFFFFFFFFFFFFFFFFFFFFFFFFFFFFFF7C
:10049000FFFFFFFFFFFFFFFFFFFFFFFFFFFFFFFF6C
:1004A000FFFFFFFFFFFFFFFFFFFFFFFFFFFFFFFF5C
:1004B000FFFFFFFFFFFFFFFFFFFFFFFFFFFFFFFF4C
:1004C000FFFFFFFFFFFFFFFFFFFFFFFFFFFFFFFF3C
:1004D000FFFFFFFFFFFFFFFFFFFFFFFFFFFFFFFF2C
:1004E000434F5059524947484543139363843485290
:1004F00049534D4944444404554F4EFFFFFFFFFFC5
:10050000C5FF96062310A3AA83FFFFFFFFFFFF2F5F
:100510002F2F2F2F2F2F2F2F2F2F2F2F2F2F2F2FEB
:100520002F2F2F2F2F2F2F2F2F2F2F2F2F2F2F2FDB
:100530002F2F2F3E3E3E3E3E3E3E3E3E3E3E3E3E06
:100540003E3E3E3E3E3E3E3E3E3E3E3E3E3E3E3ECB
:100550003E3E3E3E3E3E3E3E3E3E3E3E3E3EBCBCBF
:10056000BCBCBCBCBCBCBCBCBCBCBCBCBCBCBCCB
:10057000BCBCBCBCBCBCBCBC9D9D9D9D9D9D9DB3
```

```
:100580009D9D9D9D9DD9D9D9CBCBCBCBCBCBCBA5
:100590000CBCBCBCBCBCBCBE3E3E3E3E3E3E3E3E3D3
:1005A000E3E3E3E3E3E3E3E3E3E3E3E3E3E3E3E31B
:1005B000E367676767676767676767676767674F
:1005C00067676767676767676767676767676767BB
:1005D00067676767676767676767FFFFFFFF4B
:1005E000FFFFFFFFFFFFFFFFFFFFFFFFFFFFFF1B
:1005F000FFFFFFFFFFFFFFFFFFFFFFFFFFFFFF0B
:10060000C5FF96062310A3AA83FFFFFFFFFFFF2F5E
:100610002F2F2F2F2F2F2F2F2F2F2F2F2F2F2F2FEA
:100620002F2F2F2F2F2F2F2F2F2F2F2F2F2F2F3ECB
:100630003E3E3E3E3E3E3E3E3E3E3E3E3E3E3E3EDA
:100640003E3E3E3E3E3E3E3E3E3E3E3E3E3E3E3ECA
:100650003E3E3E3E3E3E3E3E3E3EBCBCBCBCBC44
:10066000BCBCBCBCBCBCBCBCBCBCBCBCBCBCBCCA
:100670003CBCBCBCBC9D9D9D9D9D9D9D9D9D9D9D0F
:100680009D9D9DD9D9D9D9D9D9D9D9CBCBCBCBCBD4
:10069000CBCBCBCBCBCBCBCBE3E3E3E3E3E3E302
:1006A000E3E3E3E3E3E3E3E3E3E3E3E3E3E3E31A
:1006B000E3E3E36767676767676767676767676756
:1006C00067676767676767676767676767676767BA
:1006D0006767676767676767676767676767FFFF7A
:1006E000FFFFFFFFFFFFFFFFFFFFFFFFFFFFFF1A
:1006F000FFFFFFFFFFFFFFFFFFFFFFFFFFFFFF0A
:10070000C5FF96062310A3AA83FFFFFFFFFFFF2F5D
:100710002F2F2F2F2F2F2F2F2F2F2F2F2F2F2F2FE9
:100720002F2F2F2F2F2F3E3E3E3E3E3E3E3E3E3E43
:100730003E3E3E3E3E3E3E3E3E3E3E3E3E3E3E3ED9
:100740003E3E3E3E3E3E3E3E3E3E3E3E3E3E3E3EC9
:100750003E3EBCBCBCBCBCBCBCBCBCBCBCBCBCD5
:10076000BCBCBCBCBCBCBCBCBCBCBCBC9D9D9D9D45
:100770009D9D9D9D9D9D9D9D9D9DD9D9D9D9D9D941
:10078000D9D9D9D9D9D9D9D9D9D9D9D9D9D9D9D9
:100790009D9D9D9D9CBCBCBCBCBCBCBCBCBCBCB63
:1007A000CBCBCBE3E3E3E3E3E3E3E3E3E3E3E3E361
:1007B000E3E3E3E3E3E3E3E3E3E3E3E3367676777D
:1007C000676767676767676767676767676767B9
:1007D0006767676767676767676767676767676A9
:1007E0006767676767676767FFFFFFFFFFFFFFFFD9
:1007F000FFFFFFFFFFFFFFFFFFFFFFFFFFFFFF09
:1008000040700157493BA00B927B1FF23FF3984
:1008100023FF3AB820B000D5B9FF2301B826A0C500
:10082000AEB01BC0134975400366000000064ADD7
:1008300034FD09E6344660000000000000008
:100840000000000004657430149614C714FF746F
:100850001254A9BA8FC5B8FF3967E85AE95A04301B
:10086000462EF5042EB820F0C6880447B82223018E
:10087000371760C688044700008212301371760B6
:100880000688044724DD24EDB820B000B821B000AC
:10089000B522B00044724299EF34D299CF34D235
:1008A000891034D2E93083990DF34D299CF34D289F8
:1008B0002034D28930638B0F99F700000008908EE
:1008C000000000000E3B883B927F1A8B902E8CDE933
:1008D000CD23FBA8FCA9D5F9C5B6E786E786E7079F
:1008E0000C4F1E8D7E9D983B8FFB955E8EBE9EB835C
:1008F000000D5F96D01EDF5C504E223FF3A0455FB2F
```

```
:100900000A8FCA9D5F9C5861486148614070617E86D
:10091000 6E90683C504FAD5F9BD01ED13C5240F10
:10092000024CC8AFF04301C2449040764 61D5BA32
:100930001C5B82723FFA027BB01BC01D5FFAE230B
:100940030AFC5F0A015FBC675FC03FEF679BF00F7
:10095000743014B614C714D27412B8FF3912000060
:10096000E860FF0379C6BCE960FF0379C6BCFF03FB
:100970007AC6BC244324270430FB036EF62A244E97
:10098000C6A7B827F007A0348B0496743014B614A9
:10099000C714D2741 25A0FB8FFB975E89BE99B831C
:1009A00000000000000000CBCB9400B827F0070740
:1009B000A0D5BC04C5348BFA0357C6BCD5BAFFFE1C
:1009C000AFBB0FC52477D5BA01C584008AFF0430B8
:1009D000447B8FFB938E8D6E9D68364AD46DBB63C
:1009E000D01498B8FFE8E5748F26E9044726DB7633
:1009F000D014A7B8FFE8F5740146F9044789C0D5BB
:100A0000FF53CFAF09777753306FAFC5832614D527
:100A100027AFC583D5FF274340AFC583B83C27A088
:100A2000FF5830A0B83160E62B5465B83260E632CA
:100A30005465B83360E6395465B83460E6405465AF
:100A4000B83560E6475465B83660E64E5465B83749
:100A500060E6555465B83860E65C5465B83960E6C0
:100A60006D5465446DA9B83CF017A0F9832AB83CD1
:100A7000F0A9B83D230AA0FA29BA08376037F683EF
:100A8000A7449C609729F729F7E690376037449888
:100A9000376037E6CF60449919EAD19729AFB90991
:100AA000B838F018A0C8C8E9CDD5FF5340C6B4C5C2
:100AB000FF0300AFD5FF5320C6C3FF5310C6C7D4F2
:100AC00000044D3F40044D3B40044D344F144A244DA
:100AD000984484D5FAC55301C6DCBAAFFA5380C630
:100AE000F1B826F0C6ED27A0FA43F044F3D5230170
:100AF000A0C5FA43803AB8FFB91CE8FAE9FAB36462
:100B000019851BFB961123FD6CF60FBB011C83CBD3
:100B1000B583BF00BA2F23F005070000961915FF13
:100B2000030FAF8304E79AFF8AFF2301BF706419A4
:100B30009A7F8A80D5B9FFC7095301C642F9C64ACE
:100B40006437 23DB371769A9C583B916C583272303
:100B5000FF3ABF00D5BA00C5FC03FDF65F043024A0
:100B60002EB81A19FBC68DE863FC03FEF68BBF0094
:100B7000743014B614C714D27412B8FFB91BE87ECF
:100B8000E97EFF03F0F6B764612443247 92427A5D4
:100B9000EB97EC971B1C9583AFD5FAC5C6A3F8ABB2
:100BA000F9ACFF83D5F9BD01EDA8C564E1BB0574BF
:100BB0003014B634D234D2EBAFB82723FFA0BB013B
:100BC000BC01D5BA03C534D234D2743014B614C7BC
:100BD000B8FFB903D5F9C5050000000000007C63D
:100BE000A4E8D8E9D8FC03FCAC23006C3717AC238D
:100BF0006B3717ABB631EBFACCE8F7D5BA00C5C4
:100C0000BE0A34D234D2743014B614C714FF74122E
:100C1000FF0379F61F34D234D2D5BA00C50430B8F8
:100C200027F007A0EE02D5BA00C50430FFFFFFFF92
:100C3000FFFFFFFFFFFFFFFFFFFFFFFFFFFFFFFFC4
:100C4000FFFFFFFFFFFFFFFFFFFFFFFFFFFFFFFFB4
:100C5000FFFFFFFFFFFFFFFFFFFFFFFFFFFFFFFFA4
:100C6000FFFFFFFFFFFFFFFFFFFFFFFFFFFFFFFF94
:100C7000FFFFFFFFFFFFFFFFFFFFFFFFFFFFFFFF84
:100C8000FFFFFFFFFFFFFFFFFFFFFFFFFFFFFFFF74
```

```
:100C9000FFFFFFFFFFFFFFFFFFFFFFFFFFFFFFFF64
:100CA000FFFFFFFFFFFFFFFFFFFFFFFFFFFFFFFF54
:100CB000FFFFFFFFFFFFFFFFFFFFFFFFFFFFFFFF44
:100CC000FFFFFFFFFFFFFFFFFFFFFFFFFFFFFFFF34
:100CD000FFFFFFFFFFFFFFFFFFFFFFFFFFFFFFFF24
:100CE000434F505952494748543139383843485294
:100CF00049534D4944444C45544F4EFFFFFFFFFFBD
:100D0000C5FF96062310A3AA83FFFFFFFFFFFF2F57
:100D10002F2F2F2F2F2F2F2F2F2F2F2F2F2F2F2FE3
:100D20002F2F2F2F2F2F2F2F2F2F2F2F2F2F2F2FD3
:100D30002F2F2F2F3E3E3E3E3E3E3E3E3E3E3E3E0F
:100D40003E3E3E3E3E3E3E3E3E3E3E3E3E3E3E3EC3
:100D50003E3E3E3E3E3E3E3E3E3E3E3E3E3E3EBC35
:100D6000BCBCBCBCBCBCBCBCBCBCBCBCBCBCBCC3
:100D7000BCBCBCBCBCBCBCBC9D9D9D9D9D9D9D8C
:100D80009D9D9D9D9D9DD9D9D9CBCBCBCBCBCBCBAB
:100D9000CBCBCBCBCBCBE3E3E3E3E3E3E3E3E3B3
:100DA000E3E3E3E3E3E3E3E3E3E3E3E3E3E3E313
:100DB0006767676767676767676767676767C3
:100DC0006767676767676767676767676767B3
:100DD000676767676767676767FFFFFFFFFFAB
:100DE000FFFFFFFFFFFFFFFFFFFFFFFFFFFFFF13
:100DF000FFFFFFFFFFFFFFFFFFFFFFFFFFFFFF03
:100E0000C5FF96062310A3AA83FFFFFFFFFFFF2F56
:100E10002F2F2F2F2F2F2F2F2F2F2F2F2F2F2F2FE2
:100E20002F2F2F2F2F2F2F2F2F2F2F2F2F2F2F2FD2
:100E30002F2F3E3E3E3E3E3E3E3E3E3E3E3E3E3EF0
:100E40003E3E3E3E3E3E3E3E3E3E3E3E3E3E3E3EC2
:100E50003E3E3E3E3E3E3E3E3E3E3E3E3E3EBCBC6
:100E6000BCBCBCBCBCBCBCBCBCBCBCBCBCBCBCC2
:100E7000BCBCBCBCBCBCBCBC9D9D9D9D9D9D9DAA
:100E80009D9D9D9D9D9DD9D9D9CBCBCBCBCBCBCB9C
:100E9000CBCBCBCBCBCBE3E3E3E3E3E3E3E3E3CA
:100EA000E3E3E3E3E3E3E3E3E3E3E3E3E3E3E312
:100EB000E367676767676767676767676767646
:100EC0006767676767676767676767676767B2
:100ED000676767676767676767FFFFFFFF42
:100EE000FFFFFFFFFFFFFFFFFFFFFFFFFFFFFF12
:100EF000FFFFFFFFFFFFFFFFFFFFFFFFFFFFFF02
:100F0000C5FF96062310A3AA83FFFFFFFFFFFF2F55
:100F10002F2F2F2F2F2F2F2F2F2F2F2F2F2F2F2FE1
:100F20002F2F2F2F2F2F2F2F2F2F2F2F2F2F2F3EC2
:100F30003E3E3E3E3E3E3E3E3E3E3E3E3E3E3E3ED1
:100F40003E3E3E3E3E3E3E3E3E3E3E3E3E3E3E3EC1
:100F50003E3E3E3E3E3E3E3E3E3E3EBCBCBCBC3B
:100F6000BCBCBCBCBCBCBCBCBCBCBCBCBCBCBCC1
:100F7000BCBCBCBC9D9D9D9D9D9D9D9D9D9D06
:100F80009D9D9DD9D9D9D9D9D9D9CBCBCBCBCB
:100F9000CBCBCBCBCBCBCBE3E3E3E3E3E3E3F9
:100FA000E3E3E3E3E3E3E3E3E3E3E3E3E3E3E311
:100FB000E3E3E367676767676767676767674D
:100FC0006767676767676767676767676767B1
:100FD000676767676767676767FFFF71
:100FE000FFFFFFFFFFFFFFFFFFFFFFFFFFFFFF11
:100FF000FFFFFFFFFFFFFFFFFFFFFFFFFFFFFF01
:00000001FF
```

We claim:

1. An apparatus for establishing a distance between a tool portion of a machine and a reference surface as a reference distance when said tool portion is placed in a selected position relative to said reference surface, comprising:
- means for detecting an event indicating that said tool portion is located at said selected position relative to said reference surface;
- a table storing control words which indicate the amount and direction of a change in tool position for establishing said tool portion in the position it was in when said reference distance was established, including a control word indicating that no change in the position of the tool portion is necessary;
- acoustic means coupled to said detecting means for generating an acoustic signal and transmitting said acoustic signal toward said reference surface and for detecting a measure of the round trip travel time between the time of generation of said acoustic signal and the time when an echo of said acoustic signal returns to said acoustic means after bouncing off said reference surface and for mapping said measure into the control word in said table indicating that no change in the tool position is necessary and for establishing said mapping as a reference mapping for use in generating control words from measures of round trip travel time for acoustic signals during future acoustic distance measuring of the distance between the tool portion and the reference surface.

2. The apparatus of claim 1 wherein said acoustic means further comprises temperature compensation means for sensing the temperature of the air and generating a temperature compensation factor as part of said reference mapping.

3. An apparatus for establishing a distance between a tool portion of a machine and a reference surface as a reference distance when said tool portion is placed in a selected position relative to said reference surface, comprising:
- means for detecting an event indicating that said tool portion is located at said selected position relative to said reference surface;
- reference means coupled to said detecting means for generating control words which indicate the amount and direction of a change in tool position for establishing said tool portion in the position it was in when said reference distance was established, including a control word indicating that no change in the position of the tool portion is necessary;
- acoustic means coupled to said detecting means for generating an acoustic signal and transmitting said acoustic signal toward said reference surface and for detecting a measure of the round trip travel time between the time of generation of said acoustic signal and the time when an echo of said acoustic signal returns to said acoustic means after bouncing off said reference surface and for providing said measure to said reference means for generating said control word indicating that no change in the tool position is necessary and for establishing said first control word as a reference control word relating to said selected position of said tool portion relative to said reference surface.

4. The apparatus of claim 3, wherein said acoustic means further comprises temperature compensation means for sensing the temperature of the air and generating a temperature compensation factor, for compensating changes in said tool position for temperature changes.

* * * * *

REEXAMINATION CERTIFICATE (2627th)
United States Patent [19]

Middleton et al.

[11] B1 4,924,374

[45] Certificate Issued Jul. 18, 1995

[54] METHOD FOR AUTOMATIC POSITION CONTROL OF A TOOL

[75] Inventors: Christohper O. Middleton, Capitola; Colin L. Robson, San Jose, both of Calif.

[73] Assignee: Spectra Physics, San Jose, Calif.

Reexamination Request:
No. 90/002,233, Dec. 18, 1990

Reexamination Certificate for:
Patent No.: 4,924,374
Issued: May 8, 1990
Appl. No.: 204,541
Filed: Jun. 9, 1988

[51] Int. Cl.$^6$ .................. G06F 19/00; G05D 1/04
[52] U.S. Cl. .................. 364/167.01; 172/4.5; 364/424.07; 364/561; 367/127
[58] Field of Search ............ 364/424.07, 474.18, 364/474.34, 474.35, 474.37, 177, 167.01, 551.02, 571.07, 561, 562; 318/624; 56/10.2, DIG. 15; 73/624–629; 172/4, 4.5; 367/13, 97–99, 127, 908

[56] References Cited

U.S. PATENT DOCUMENTS

| | | |
|---|---|---|
| 2,775,748 | 12/1956 | Rod et al. . |
| 2,780,795 | 2/1957 | Ambrosio ................. 340/3 |
| 2,942,258 | 6/1960 | Priest . |
| 2,972,143 | 2/1961 | Schwartz et al. . |
| 3,044,195 | 7/1962 | Atkinson . |
| 3,094,693 | 6/1963 | Taylor . |
| 3,102,983 | 9/1963 | Turner . |
| 3,360,794 | 12/1967 | Anderson et al. . |
| 3,490,539 | 1/1970 | Holmes et al. . |
| 3,495,663 | 2/1970 | Scholl et al. . |
| 3,516,051 | 6/1970 | Arberman et al. . |
| 3,554,291 | 1/1971 | Rogers . |
| 3,561,538 | 2/1971 | Curlett . |
| 3,588,795 | 6/1971 | Linaidos et al. . |
| 3,609,671 | 9/1971 | Webster . |
| 3,637,026 | 1/1972 | Snow . |
| 3,690,339 | 9/1972 | McKinnon et al. . |
| 3,717,140 | 2/1973 | Greenwood . |
| 3,721,978 | 3/1973 | Doggett, Jr. . |
| 3,749,504 | 7/1973 | Smith . |
| 3,749,997 | 7/1973 | Cohen et al. . |
| 3,768,097 | 10/1973 | Ziegler . |
| 3,900,365 | 8/1975 | Barclay et al. . |
| 3,943,491 | 3/1976 | Castleberry et al. . |
| 3,974,699 | 8/1976 | Morris et al. . |
| 3,995,267 | 11/1976 | Tripp . |
| 4,004,289 | 1/1977 | Kirk . |
| 4,006,394 | 1/1977 | Cuda et al. . |
| 4,030,832 | 6/1977 | Rando et al. . |
| 4,053,018 | 10/1977 | Takeda . |
| 4,062,634 | 12/1977 | Rando et al. . |
| 4,064,945 | 12/1977 | Haney . |
| 4,081,033 | 3/1978 | Bulger et al. . |
| 4,136,508 | 1/1979 | Coleman et al. . |
| 4,167,592 | 9/1979 | Gabel et al. . |
| 4,199,246 | 4/1980 | Muggli . |
| 4,225,226 | 9/1980 | Davidson et al. . |
| 4,225,950 | 9/1980 | Kotera et al. . |
| 4,247,870 | 1/1981 | Gabel et al. . |
| 4,263,973 | 4/1981 | Boulais et al. . |
| 4,300,638 | 11/1981 | Katayama et al. . |
| 4,357,672 | 11/1982 | Howells et al. ............. 364/561 |
| 4,365,301 | 12/1982 | Arnold et al. . |
| 4,371,942 | 1/1983 | Damikolas . |
| 4,402,368 | 9/1983 | Moberley . |
| 4,414,792 | 11/1983 | Bettencourt et al. ......... 56/10.2 |
| 4,428,055 | 1/1984 | Kelly et al. . |
| 4,437,295 | 3/1984 | Rock . |
| 4,437,619 | 3/1984 | Cary et al. ............. 242/75.51 |
| 4,439,846 | 3/1984 | Rodriguez . |
| 4,459,689 | 7/1984 | Biber . |
| 4,466,076 | 8/1984 | Rosenthal . |
| 4,470,299 | 9/1984 | Soltz . |
| 4,507,910 | 4/1985 | Thornley et al. . |
| 4,561,064 | 12/1985 | Bruggen et al. . |
| 4,567,766 | 2/1986 | Seiferling ............. 73/597 |
| 4,573,124 | 2/1986 | Seiferling . |
| 4,578,997 | 4/1986 | Soltz . |
| 4,581,726 | 4/1986 | Makino et al. ............. 367/99 |
| 4,604,681 | 8/1986 | Sakashita . |
| 4,630,226 | 12/1986 | Tanaka . |
| 4,663,712 | 5/1987 | Kishida ............. 364/424 |
| 4,715,003 | 12/1987 | Keller et al. . |
| 4,731,762 | 3/1988 | Hanks . |
| 4,733,355 | 3/1988 | Davidson et al. ........ 364/424 |
| 4,775,940 | 8/1988 | Nishida et al. . |
| 4,805,086 | 2/1989 | Nielsen et al. . |

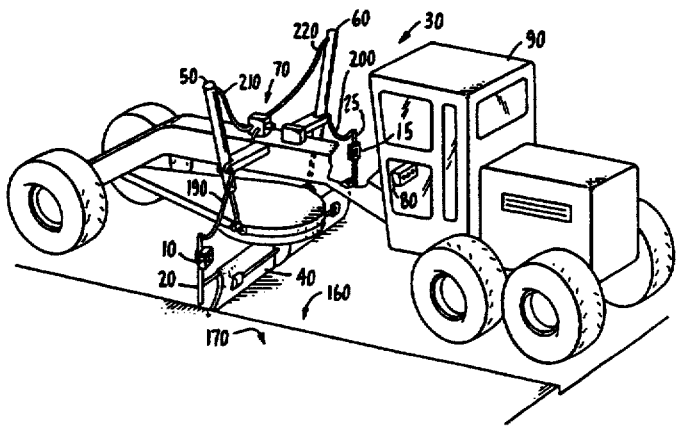

| | | |
|---|---|---|
| 4,807,131 | 2/1989 | Clegg . |
| 4,818,925 | 4/1989 | Lahm et al. . |
| 4,820,041 | 4/1989 | Davidson et al. . |
| 4,825,146 | 4/1989 | Kotyk et al. . |
| 4,853,694 | 8/1989 | Tomecek .......................... 340/621 |
| 4,914,593 | 4/1990 | Middleton et al. . |
| 4,918,608 | 4/1990 | Middleton et al. . |
| 4,924,374 | 5/1990 | Middleton et al. . |

FOREIGN PATENT DOCUMENTS

| | | |
|---|---|---|
| 542762 | 5/1985 | Australia . |
| 0108398 | 5/1984 | European Pat. Off. . |
| 0160195 | 11/1985 | European Pat. Off. . |
| 0260113 | 3/1988 | European Pat. Off. . |
| 0262990 | 4/1988 | European Pat. Off. . |
| 2155193 | 5/1973 | Germany . |
| 155116 | 5/1982 | Germany . |
| 87138743 | 1/1988 | Germany . |
| 51-148901 | 12/1976 | Japan . |
| 53-70503 | 6/1978 | Japan . |
| 53-89207 | 8/1978 | Japan . |
| 59-46570 | 3/1984 | Japan . |
| 59-102304 | 6/1984 | Japan . |
| 2120419 | 11/1983 | United Kingdom . |
| 2173309 | 10/1986 | United Kingdom . |

OTHER PUBLICATIONS

Agronics Pty., Ltd.; European Patent Application 260,113; filed Sep. 8, 1987; published Mar. 16, 1988.
Katz, et al., "The 16-Bit 8096 Programming, Interfacing, Applications", MTI Publications, 1986.
Maslin, "A Simple Ultrasonic Ranging System", President at the 102nd Convention of the Audio Engineering Society on May 12, 1983.
Polaroid, "Ultrasonic Ranging System", [publication date unknown, but believed to be prior to 1985].
Coad et al., ASAE, Dec. 11–14, 1979, New Orleans, La., Paper No. 79-1571.
El-Ibiary et al, *Hydraulics & Pneumatics*, v. 33, No. 7, Jul. 1980, p. 86.
French et al., *Annals of the CIRP*, (1981) 30:327-332.
Gunderson et al., "Agricultural Electronics—1983 and Beyond" ASAE, Dec. 11–13, 1983, Chicago, Ill., vol. I, p. 117.
Gunderson et al., ASAE, Dec. 15–18, 1981, Chicago, Ill., Paper No. 81-1602.
Gunderson, ASAE, Dec. 15–18, 1981, Chicago, Ill., Paper No. 81-1603.
Ho, Proc. Nat'l. Conf. of Fluid Power, Dec. 1984, Chicago, Ill., pp. 49–53.
Kirk, "Swather Edge Guide Steering Control System" *Transactions of the ASAE*, 1976, pp. 639–646.
Klassen, Proc. Nat'l Conf. on Fluid Power, Dec. 1983, Los Angeles, Calif., pp. 186–189.
Knuth, "The Art of Computer Programming" (1973), p. 154.
Kotyk, ASAE, Oct. 14–15, 1983, Weyburn, Saskatchewan, Paper No. NCR83-203.
Kotyk, ASAE, Oct. 14–15, 1983, Weyburn, Saskatchewan Paper No. NCR83-201.
Kramme, *Electronics*, Jan. 5, 1970, pp. 88–95.
Leventhal, *Electronics Design*, Aug. 16, 1977, pp. 82–89.
Nine et al., ASAE, Jun. 27–30, 1982, Madison, Wis., Paper No. 82-1067.
Polaroid Ultrasonic Ranging System Handbook Application Notes/Technical papers (1980).
Polaroid Ultrasonic Ranging Unit Manual; undated.
Schoenall, Int'l Conf. on the Use of Micros in Fluid Engineering, Jun. 7–8, 1983, London, England, pp. 107–114.
Spectra-Physics Construction & Agricultural Division Laserplane Tech. Brochure No. 22481-016, 1986.
Swaminathan, *J. Inst. Elec. & Telecom. Engrs.*, (1978) 24:257-260.
Thornley, ASAE, Dec. 11–13, 1983, Chicago, Ill., vol. II, p.754.
Wilson, ASAE, Dec. 16–19, 1986, Chicago, Ill., Paper No. 86-1611.
KB01777 (Fortress Allatt Co.); undated.
KB01784 (Langham Engineering); Sep. 1983.
KB01790 (Balderson, Inc.); Jul. 1986.
KB01796 (Agtek); undated.
KB01800 (Hydra-Mation Control Systems); undated.
KB01808 (Honeywell/Sundstrand Mobile Controls); Mar. 1979.
KB01816 (Galion/Dresser); undated.
KB01822 (Galion/Dresser); undated.
KB01830 (Berry Tractor & Equipment); undated.
KB01834 (Caterpillar); undated.
KB01844 (Honeywell); Jun. 1976.
KB01848 (Honeywell); undated.
KB01918; (Huron Mfg); undated.
KB01925 (Kobelco); undated.
KB01926 (Balderson); undated.

KB02009 (Analog Devices); undated.
KB02010 (National Semiconductor); undated.
KB02015 (Projects Unlimited); undated.
KB02019 (Accusonic); undated.
KB02020 (Senstek); undated.
KB02023 (Massa Products); undated.
KB02024 (EDO); undated.
KB02025 (NTK Technical Ceramics); Sep. 1965.
KB02043 (International Transducer Corp.); 1984.
KB02058 (International Transducer Corp.); undated.
KB02067 (Shokai Far East Ltd.); undated.
KB02509 (Polaroid); undated.
KB02514 (Polaroid); undated.
KB02519 (Polaroid); undated.
KB02650 (Electro Corp); undated.
KB03017 (Massa Products); undated.
KB03026 (Blatek Industries); Feb. 1983.
KB12638 (National Semiconductor); undated.
Senstek product brochures entitled "Header Height Control" and Village Depth Control; undated.

*Primary Examiner*—Joseph Ruggiero

[57]  ABSTRACT

A method and apparatus for automatically controlling the position of a tool carried by a machine, which in the preferred embodiment may be the blade of a grader of paver for leveling a surface at a chosen depth. The method includes determination of time taken for an acoustic pulse to travel from a transducer to a reference surface and back, with this value being used to calibrate a microprocessor-controlled distance-measuring device. As the grader moves over a surface to be graded, the distance to the reference surface is constantly detected by a repeated emission and detection of such acoustic pulses. The timing of the echoed pulses is converted to addresses in a look-up table which contains control words symbolizing commands to be given to hydraulic rams carried by the grader. By implementing these commands, the depth of the blade relative to the reference surface is constantly updated, compensating for variations with the height of the reference surface. A thermistor is provided to automatically compensate for temperature variations as the grading takes place. Displays are provided for the operator of the vehicle to show what type of adjustments are being made to the blade, and whether the height of the reference surface is outside the range of sensitivity of the follower. The follower is automatically calibrated for a given blade depth by repeated incrementation of a delay time variable until a zero adjustment command is generated for the blade control.

REEXAMINATION CERTIFICATE ISSUED UNDER 35 U.S.C. 307

THE PATENT IS HEREBY AMENDED AS INDICATED BELOW.

Matter enclosed in heavy brackets [ ] appears in the patent, but has been deleted and is no longer a part of the patent; matter printed in italics indicates additions made to the patent.

AS A RESULT OF REEXAMINATION, IT HAS BEEN DETERMINED THAT:

Claims 1 and 3 are determined to be patentable as amended.

Claims 2 and 4, dependent on an amended claim, are determined to be patentable.

1. An apparatus for establishing a distance between a tool portion of a machine and a reference surface as a reference distance when said tool portion is placed in a selected position relative to said reference surface, comprising:
   means for detecting an event indicating that said tool portion is located at said selected position relative to said reference surface;
   a table storing control words *each of* which [indicate the] *indicates an* amount and direction of a change in tool position for establishing said tool portion in the position it was in when said reference distance was established, including a control word indicating that no change in the position of the tool portion is necessary; *and*
   acoustic means coupled to said detecting means for generating an acoustic signal and transmitting said acoustic signal toward said reference surface and for detecting a measure of the round trip travel time between the time of generation of said acoustic signal and the time when an echo of said acoustic signal returns to said acoustic means after bouncing off said reference surface and for mapping said measure into the control word in said table indicating that no change in the tool position is necessary and for establishing said mapping as a reference mapping for use in generating control words from measures of round trip travel time for acoustic signals during future acoustic distance measuring of the distance between the tool portion and the reference surface.

3. An apparatus for establishing a distance between a tool portion of a machine and a reference surface as a reference distance when said tool portion is placed in a selected position relative to said reference surface, comprising:
   means for detecting an event indicating that said tool portion is located at said selected position relative to said reference surface;
   reference means coupled to said detecting means for generating control words *each of* which [indicate the] *indicates an* amount and direction of a change in tool position for establishing said tool portion in the position it was in when said reference distance was established, including a control word indicating that no change in the position of the tool portion is necessary; *and*
   acoustic means coupled to said detecting means for generating [an] *a calibration* acoustic signal and transmitting said *calibration* acoustic signal toward said reference surface and for detecting a measure of the round trip travel time between the time of generation of said *calibration* acoustic signal and the time when an echo of said *calibration* acoustic signal returns to said acoustic means after bouncing off said reference surface and for providing said measure to said reference means for generating said control word indicating that no change in the tool position is necessary and for establishing said [first] control word as a reference control word relating to said selected position of said tool portion relative to said reference surface.

* * * * *